(12) United States Patent
Watanabe et al.

(10) Patent No.: US 11,159,719 B2
(45) Date of Patent: Oct. 26, 2021

(54) IMAGE PROCESSING APPARATUS AND OUTPUT INFORMATION CONTROL METHOD

(71) Applicant: SONY SEMICONDUCTOR SOLUTIONS CORPORATION, Kanagawa (JP)

(72) Inventors: Goshi Watanabe, Saitama (JP); Hirotaka Goto, Chiba (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 16/961,028

(22) PCT Filed: Nov. 16, 2018

(86) PCT No.: PCT/JP2018/042408
§ 371 (c)(1),
(2) Date: Jul. 9, 2020

(87) PCT Pub. No.: WO2019/146226
PCT Pub. Date: Aug. 1, 2019

(65) Prior Publication Data
US 2021/0067695 A1  Mar. 4, 2021

(30) Foreign Application Priority Data

Jan. 25, 2018 (JP) .............................. JP2018-010642

(51) Int. Cl.
*H04N 5/232* (2006.01)
*H04N 9/04* (2006.01)

(52) U.S. Cl.
CPC ..... *H04N 5/23232* (2013.01); *H04N 5/23222* (2013.01); *H04N 5/232935* (2018.08); *H04N 5/232941* (2018.08); *H04N 9/0455* (2018.08)

(58) Field of Classification Search
CPC ......... H04N 5/23232; H04N 5/232941; H04N 9/0455; H04N 5/232935; H04N 5/23222
See application file for complete search history.

(56) References Cited

U.S. PATENT DOCUMENTS 6,809,771 B1  10/2004  Hamaguchi et al.
9,414,037 B1*  8/2016  Solh ..................... H04N 5/232
(Continued)

FOREIGN PATENT DOCUMENTS

CN  103081483 A  5/2013
CN  106664356 A  5/2017
(Continued)

OTHER PUBLICATIONS

International Search Report and Written Opinion of PCT Application No. PCT/JP2018/042408, dated Jan. 8, 2019, 10 pages ISRWO.
(Continued)

*Primary Examiner* — Timothy J Henn
(74) *Attorney, Agent, or Firm* — Chip Law Group

(57) ABSTRACT

An apparatus and a method are achieved in which guide information for enabling a high-quality composite image to be captured is output. Included are a composite image generation unit that performs a process of combining a color image and a black-and-white image captured from different viewpoints, to generate a composite image, and a display information control unit that performs control such that auxiliary information regarding the composite image is displayed on a display unit. In a case where a subject is too close or in a case where a high-quality composite image cannot be generated due to an obstacle, the display information control unit outputs a proximity alert or an obstacle alert as warning information, and also displays a composite image adaptation level. Moreover, a composite image, a
(Continued)

color image, and the like are displayed in parallel so that a user can select an image to be recorded.

11 Claims, 22 Drawing Sheets

(56) References Cited

U.S. PATENT DOCUMENTS

| | | | |
|---|---|---|---|
| 2004/0189829 A1* | 9/2004 | Fukuda | H04N 5/232941 |
| | | | 348/239 |
| 2012/0013708 A1* | 1/2012 | Okubo | H04N 13/122 |
| | | | 348/43 |
| 2013/0128072 A1 | 5/2013 | Kobayashi | |
| 2016/0050351 A1 | 2/2016 | Lee et al. | |
| 2016/0234437 A1 | 8/2016 | Kuwada et al. | |
| 2020/0092474 A1 | 3/2020 | Kuwada et al. | |

FOREIGN PATENT DOCUMENTS

| | | |
|---|---|---|
| EP | 2615837 A | 7/2013 |
| JP | 2005-223605 A | 8/2005 |
| JP | 2007-208346 A | 8/2007 |
| JP | 4193290 B2 | 12/2008 |
| JP | 2015-197745 A | 11/2015 |
| JP | 2017-011504 A | 1/2017 |
| KR | 10-2016-0020791 A1 | 2/2016 |
| WO | 2012/033005 A1 | 3/2012 |
| WO | 2016/024755 A1 | 2/2016 |

OTHER PUBLICATIONS

Extended European Search Report of EP Application No. 18902722.0, dated Dec. 9, 2020, 07 pages.

* cited by examiner

| R | G | R | G |
|---|---|---|---|
| G | B | G | B |
| R | G | R | G |
| G | B | G | B |

| W | W | W | W |
|---|---|---|---|
| W | W | W | W |
| W | W | W | W |
| W | W | W | W |

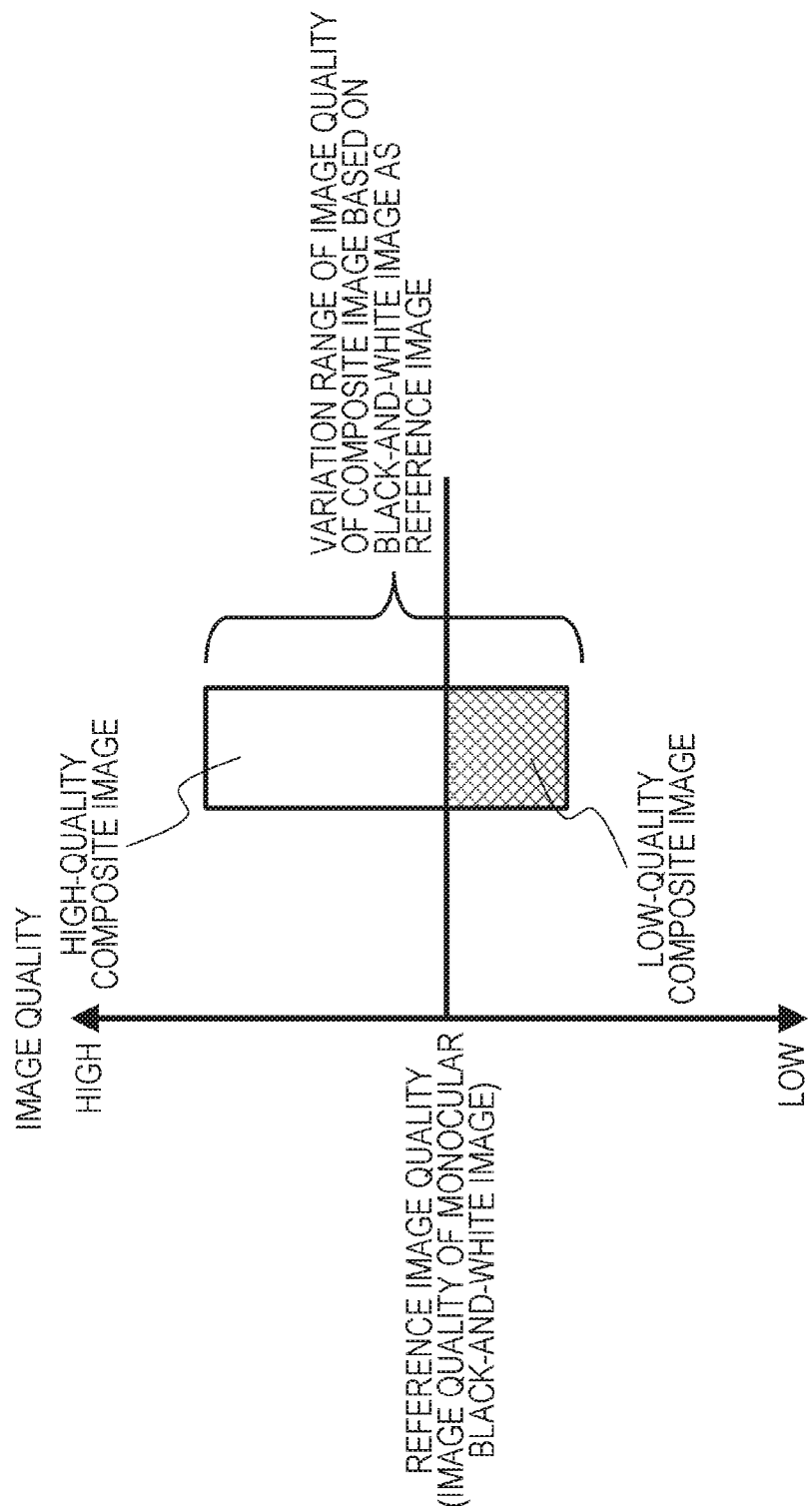

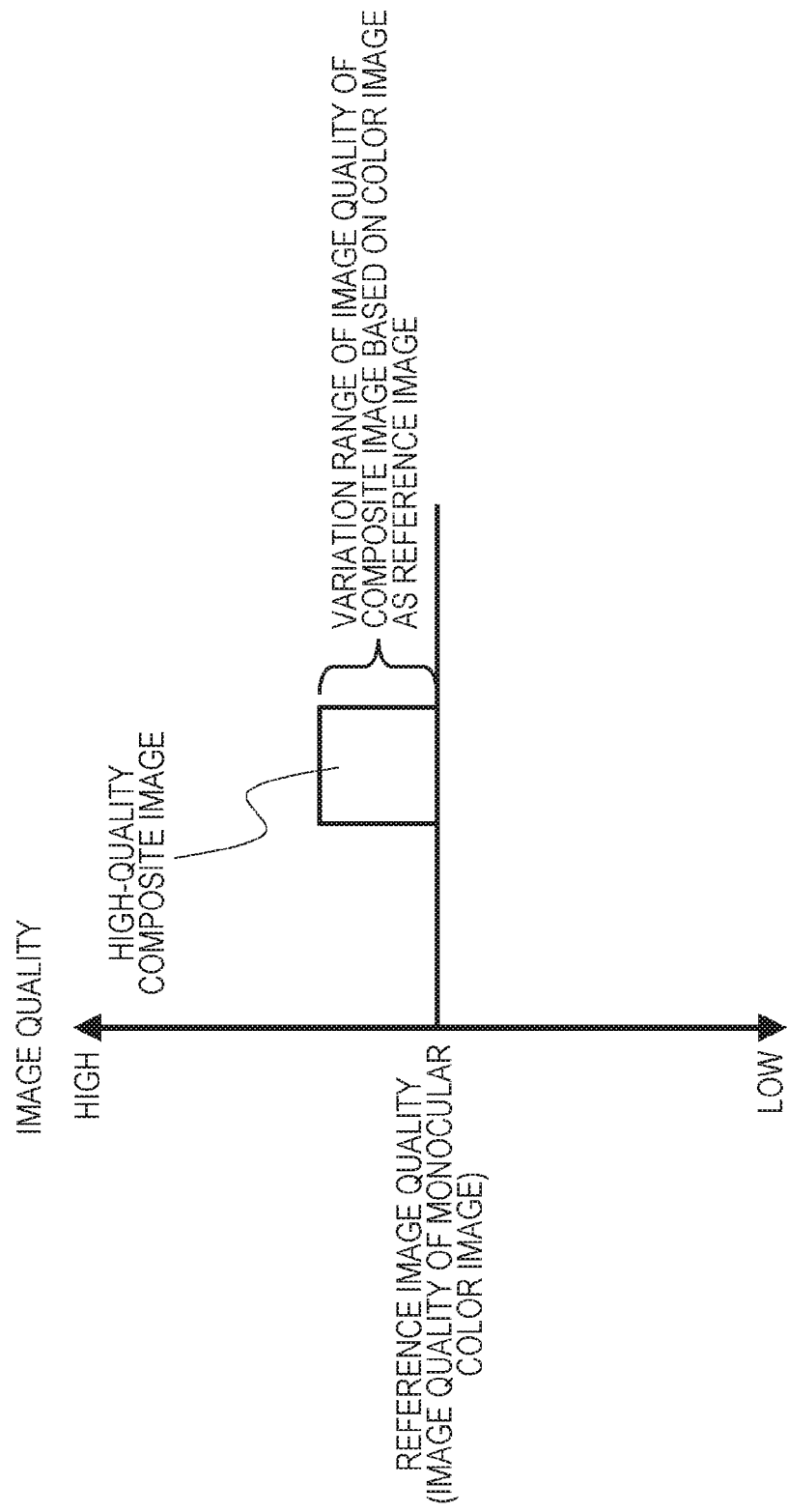

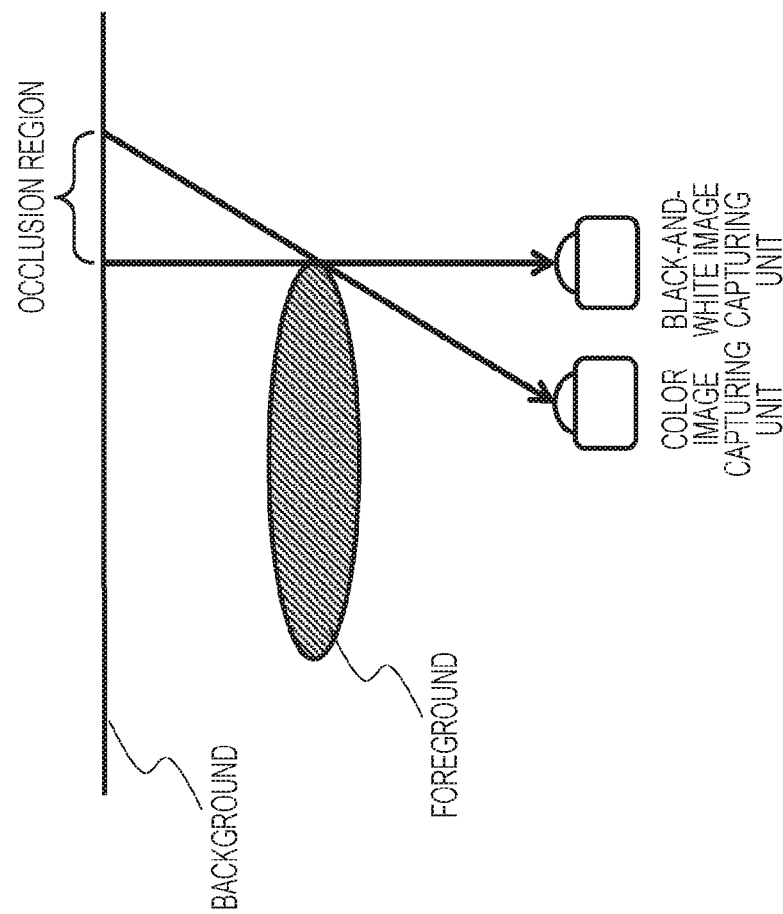

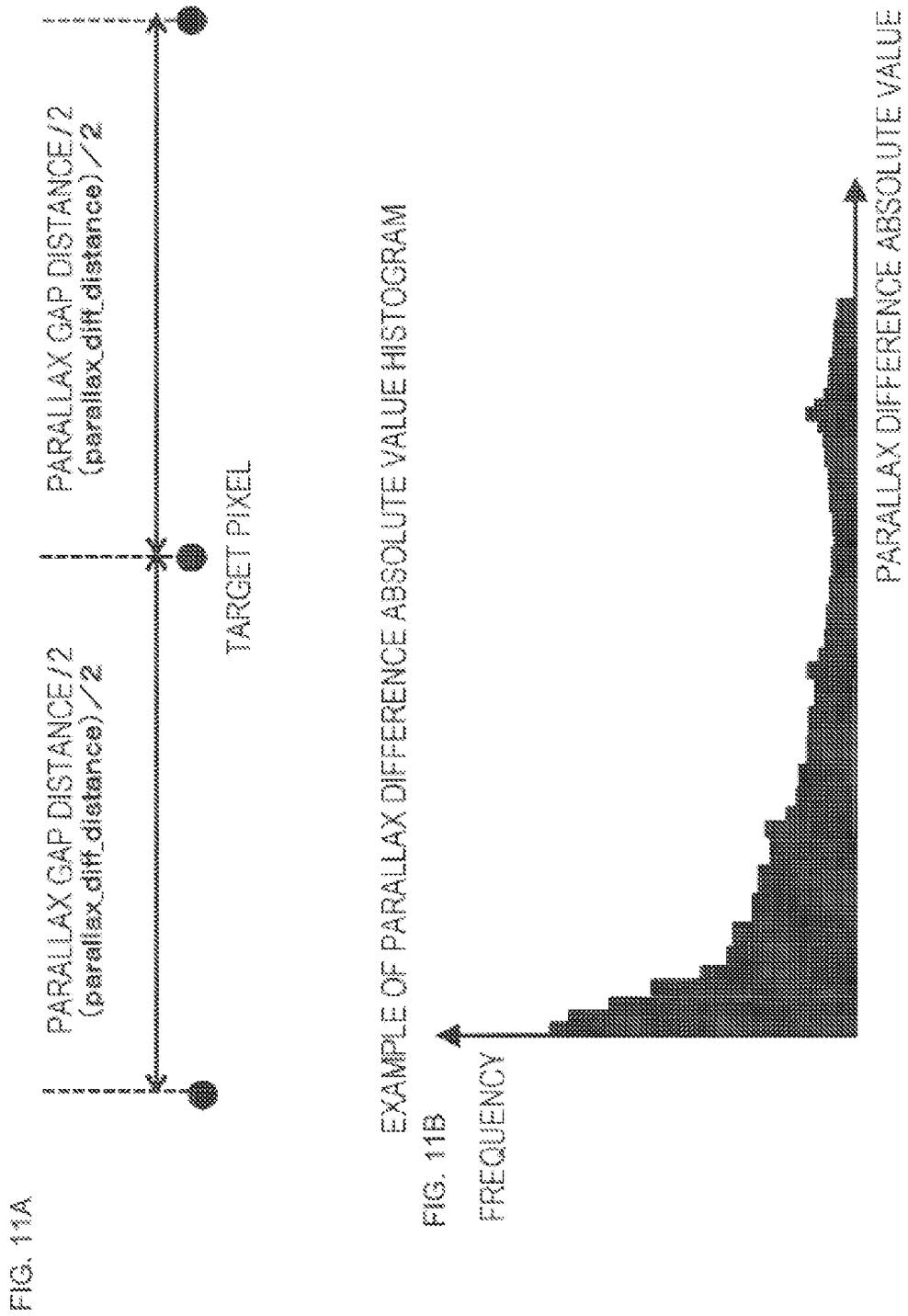

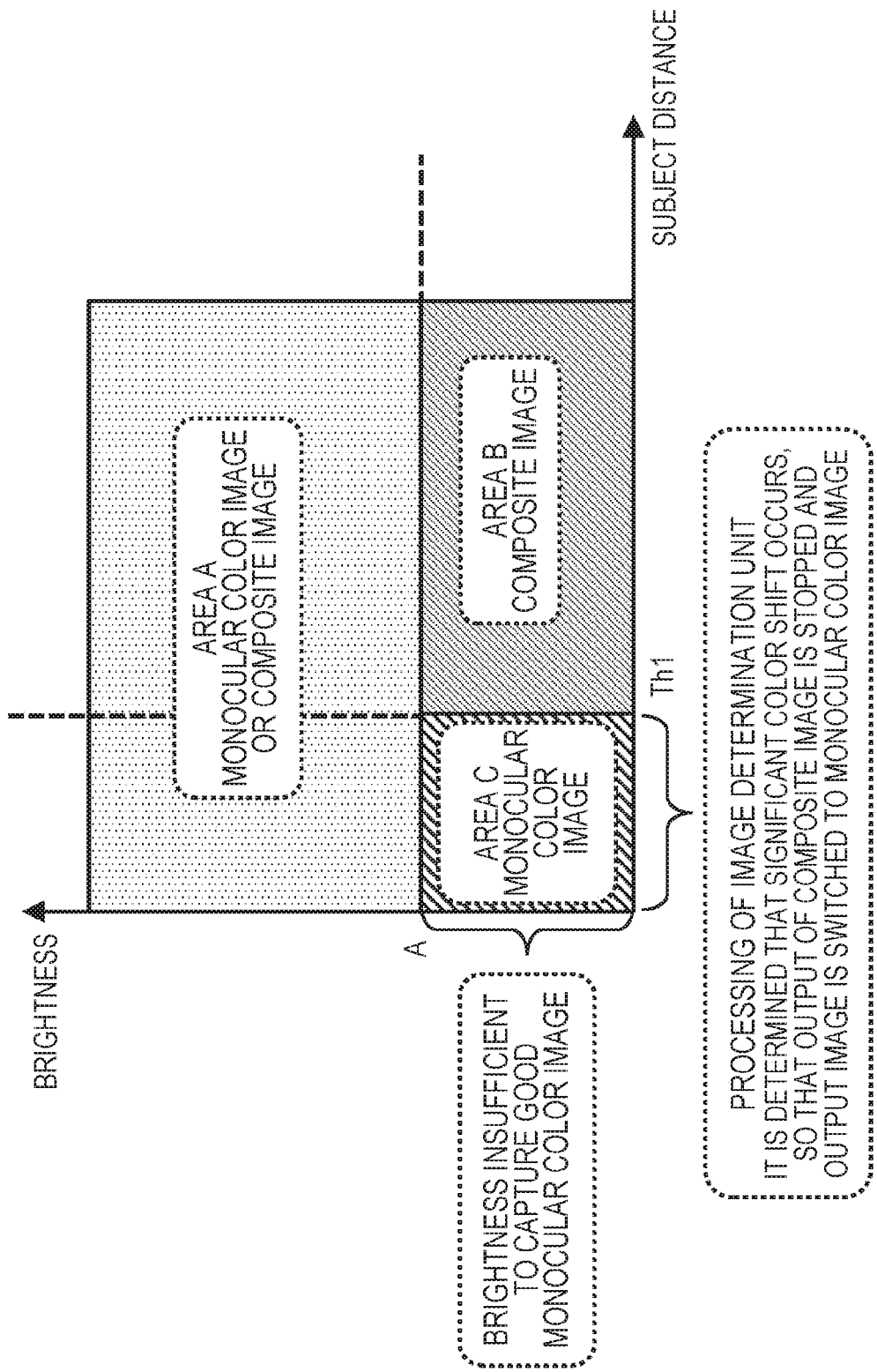

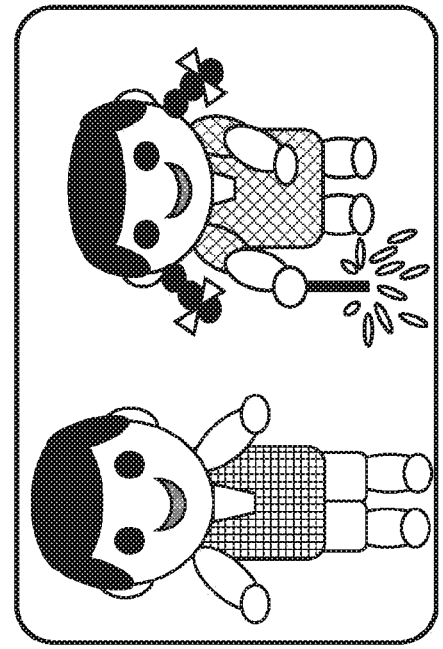
FIG. 13B  COMPOSITE IMAGE
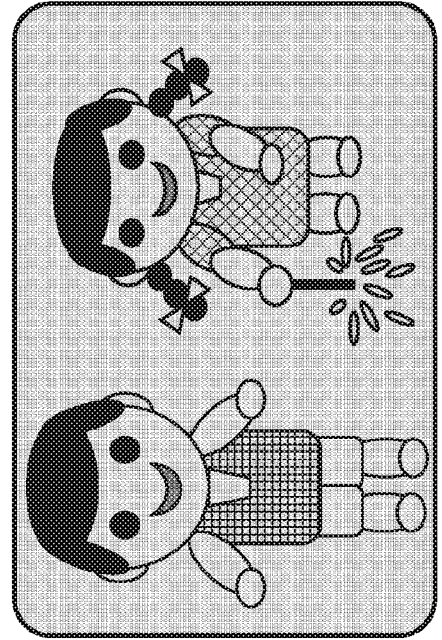
FIG. 13A  MONOCULAR COLOR IMAGE

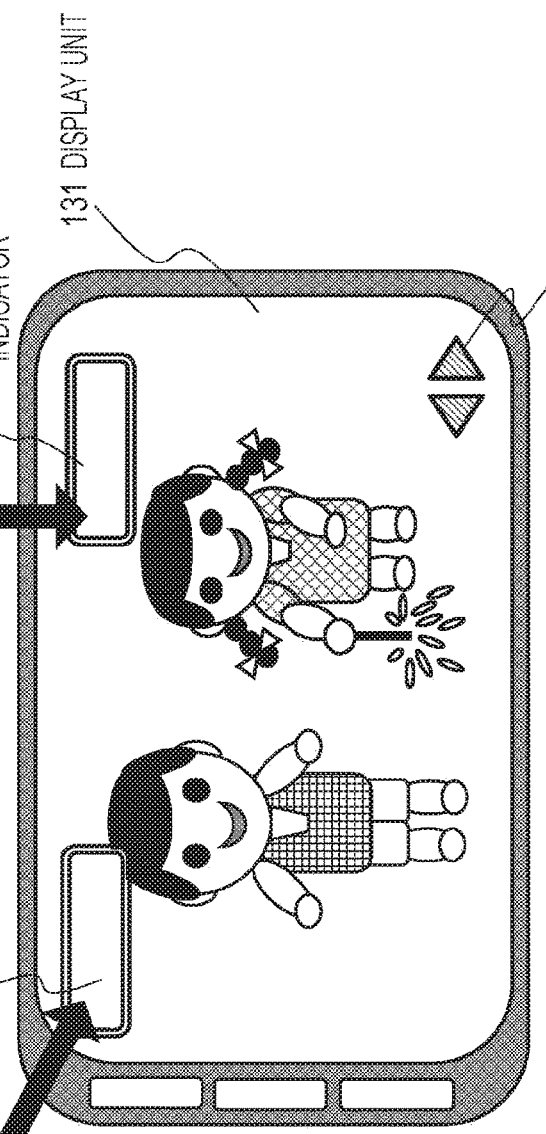

IMAGE PROCESSING APPARATUS AND OUTPUT INFORMATION CONTROL METHOD

CROSS REFERENCE TO RELATED APPLICATIONS

This application is a U.S. National Phase of International Patent Application No. PCT/JP2018/042408 filed on Nov. 16, 2018, which claims priority benefit of Japanese Patent Application No. JP 2018-010642 filed in the Japan Patent Office on Jan. 25, 2018. Each of the above-referenced applications is hereby incorporated herein by reference in its entirety.

TECHNICAL FIELD

The present disclosure relates to an image processing apparatus, an output information control method, and a program. More specifically, the present disclosure relates to an image processing apparatus that selectively outputs either of two images captured by a plurality of imaging units or a composite image of the two images, an output information control method, and a program.

BACKGROUND ART

It is known that a plurality of images with different image qualities is combined to generate a high-quality image.

For example, Patent Document 1 (Japanese Patent Application Laid-Open No. 2015-197745) discloses a configuration in which a color image and a black-and-white image are combined to generate a high-quality image by use of color information of the color image and brightness information of the black-and-white image.

CITATION LIST

Patent Document

Patent Document 1: Japanese Patent Application Laid-Open No. 2015-197745

SUMMARY OF THE INVENTION

Problems to be Solved by the Invention

Patent Document 1 described above discloses a configuration in which a color image and a black-and-white image are combined to generate a high-quality image.

However, there is no guarantee that a composite image has higher quality than a monocular color image. Depending on imaging conditions, the composite image may have higher quality, or the color image may have higher quality.

Furthermore, there are also cases where a user desires to record any of images in a memory regardless of its quality.

Even in a case where the user sets the imaging mode of a camera (image processing apparatus) to a composite image output mode, a color image may be selected and recorded, with a configuration in which the camera analyzes the feature amounts of a color image and a black-and-white image, and selects and outputs an image with the highest quality from among a composite image, the color image, and the black-and-white image according to the result of analysis.

For example, in a case where the parallax between a color image and a black-and-white image is large, the apparatus determines that it is difficult to generate a high-quality composite image. In such a case, the apparatus stops outputting and recording a composite image, and outputs and records the color image.

Thus, if the apparatus automatically determines which of a composite image, a color image, and a black-and-white image is to be generated and output, an image that the user desires may not be recorded (or displayed) in some cases.

The present disclosure is intended to solve such a problem, and an object of the present disclosure is to provide an image processing apparatus, an output information control method, and a program, the image processing apparatus being configured to present guide information for capturing a high-quality composite image and also to enable an image desired by a user to be recorded (or displayed).

Solutions to Problems

A first aspect of the present disclosure is an image processing apparatus including:

a composite image generation unit that performs a process of combining a color image and a black-and-white image captured from different viewpoints, to generate a composite image; and a display information control unit that performs control such that auxiliary information regarding the composite image is displayed on a display unit.

Moreover, a second aspect of the present disclosure is an output information control method to be performed in an image processing apparatus including a composite image generation unit that performs a process of combining a color image and a black-and-white image captured from different viewpoints, to generate a composite image, the method including:

causing a display information control unit to perform control such that auxiliary information regarding the composite image is displayed on a display unit.

Furthermore, a third aspect of the present disclosure is a program that controls an information output process in an image processing apparatus including a composite image generation unit that performs a process of combining a color image and a black-and-white image captured from different viewpoints, to generate a composite image, the program causing:

a display information control unit to perform control such that auxiliary information regarding the composite image is displayed on a display unit.

Note that the program according to the present disclosure is a program that can be provided through, for example, a storage medium or a communication medium to be provided in a computer-readable form to an information processing apparatus or a computer system that can execute various program codes. As a result of providing such a program in a computer-readable form, a process corresponding to the program is implemented on the information processing apparatus or the computer system.

Still other objects, features, and advantages of the present disclosure will be apparent from more detailed descriptions based on embodiments of the present disclosure to be described later and the accompanying drawings. Note that in the present specification, the term "system" refers to a logical set configuration of a plurality of devices, and is not limited to one in which the devices of each configuration are in the same casing.

Effects of the Invention

According to the configuration of an embodiment of the present disclosure, an apparatus and a method are achieved in which guide information for enabling a high-quality composite image to be captured is output and in addition, a composite image, a color image, and the like are displayed in parallel to enable a user to select an image to be recorded.

Specifically, there are included, for example, a composite image generation unit that performs a process of combining a color image and a black-and-white image captured from different viewpoints, to generate a composite image; and a display information control unit that performs control such that auxiliary information regarding the composite image is displayed on a display unit. In a case where a subject is too close or in a case where a high-quality composite image cannot be generated due to an obstacle, the display information control unit outputs a proximity alert or an obstacle alert as warning information, and also displays a composite image adaptation level. Moreover, a composite image, a color image, and the like are displayed in parallel so that a user can select an image to be recorded.

According to the present configuration, an apparatus and a method are achieved in which guide information for enabling a high-quality composite image to be captured is output and in addition, a composite image, a color image, and the like are displayed in parallel to enable a user to select an image to be recorded.

Note that the effects described in the present specification are merely illustrative and not restrictive, and additional effects may also be achieved.

BRIEF DESCRIPTION OF DRAWINGS

FIGS. 3A and 3B are diagrams illustrating a configuration example of an imaging element.

FIG. 4 is a diagram illustrating the image quality of a black-and-white image.

FIG. 5 is a diagram illustrating the image quality of a color image.

FIG. 6 is a diagram illustrating occlusion.

FIGS. 11A and 11B are diagrams illustrating a parallax difference absolute value histogram.

FIG. 12 is a diagram illustrating an example of determining an output image on the basis of image quality determination, and a problem thereof.

FIGS. 13A and 13B are diagrams illustrating the example of determining an output image on the basis of image quality determination, and the problem thereof.

FIGS. 14A and 14B are diagrams illustrating a process to be performed by an image processing apparatus according to the present disclosure.

MODE FOR CARRYING OUT THE INVENTION

Figure 1B:
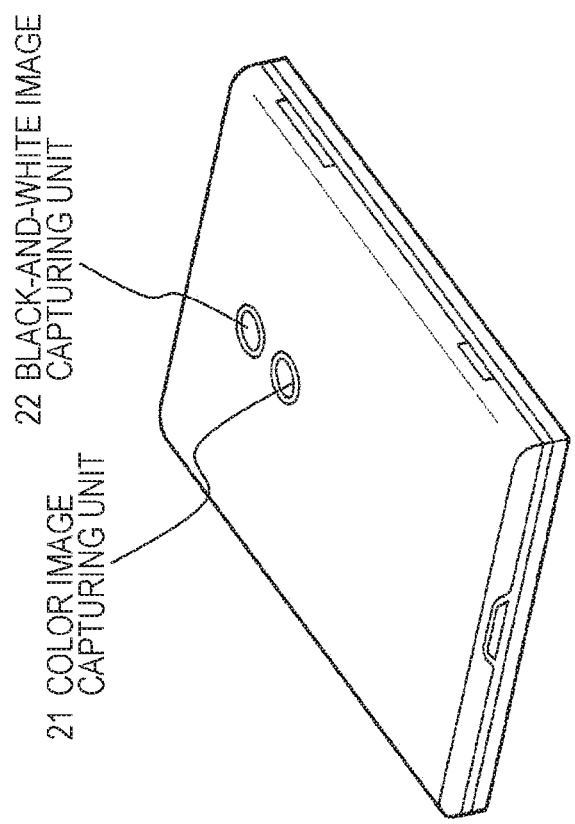
FIGS. 1A and 1B are diagrams illustrating an example of an external configuration of an image processing apparatus.
Figure 1A:
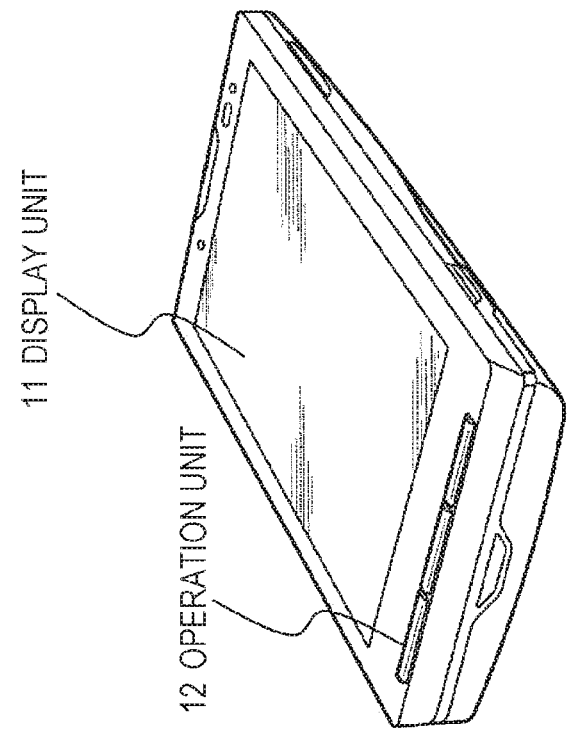

Details of an image processing apparatus, an output information control method, and a program according to the present disclosure will be described below with reference to the drawings. Note that description will be provided in accordance with the following items.
1. Configuration Example of Image Processing Apparatus
2. Composite Image Generation Process to Be Performed by Image Processing Unit
3. Problem in Output Image Automatic Selection Process
4. Regarding Configuration and Processing of Image Processing Apparatus According to Present Disclosure That Outputs Guide Information for Obtaining High-Quality Composite Image and Also Enables Selection of Output Image
5. Other Examples
6. Summary of Configurations of Present Disclosure 1. Configuration Example of Image Processing Apparatus FIGS. 1A and 1B are diagrams showing a configuration example of an image processing apparatus according to the present disclosure. FIGS. 1A and 1B show an information processing terminal (smartphone) having a camera function, which is an example of the image processing apparatus according to the present disclosure.

Note that the image processing apparatus according to the present disclosure is not limited to such an information processing terminal (smartphone), but also includes an imaging apparatus such as a camera, for example.

FIG. 1A shows the front side of an image processing apparatus 10. A display unit 11 and an operation unit 12 are provided on the front side of the image processing apparatus 10. FIG. 1B shows the back side of the image processing apparatus 10. A plurality of imaging units, that is, a color image capturing unit 21 and a black-and-white image capturing unit 22 are provided on the back side of the image processing apparatus 10.

Figure 2:
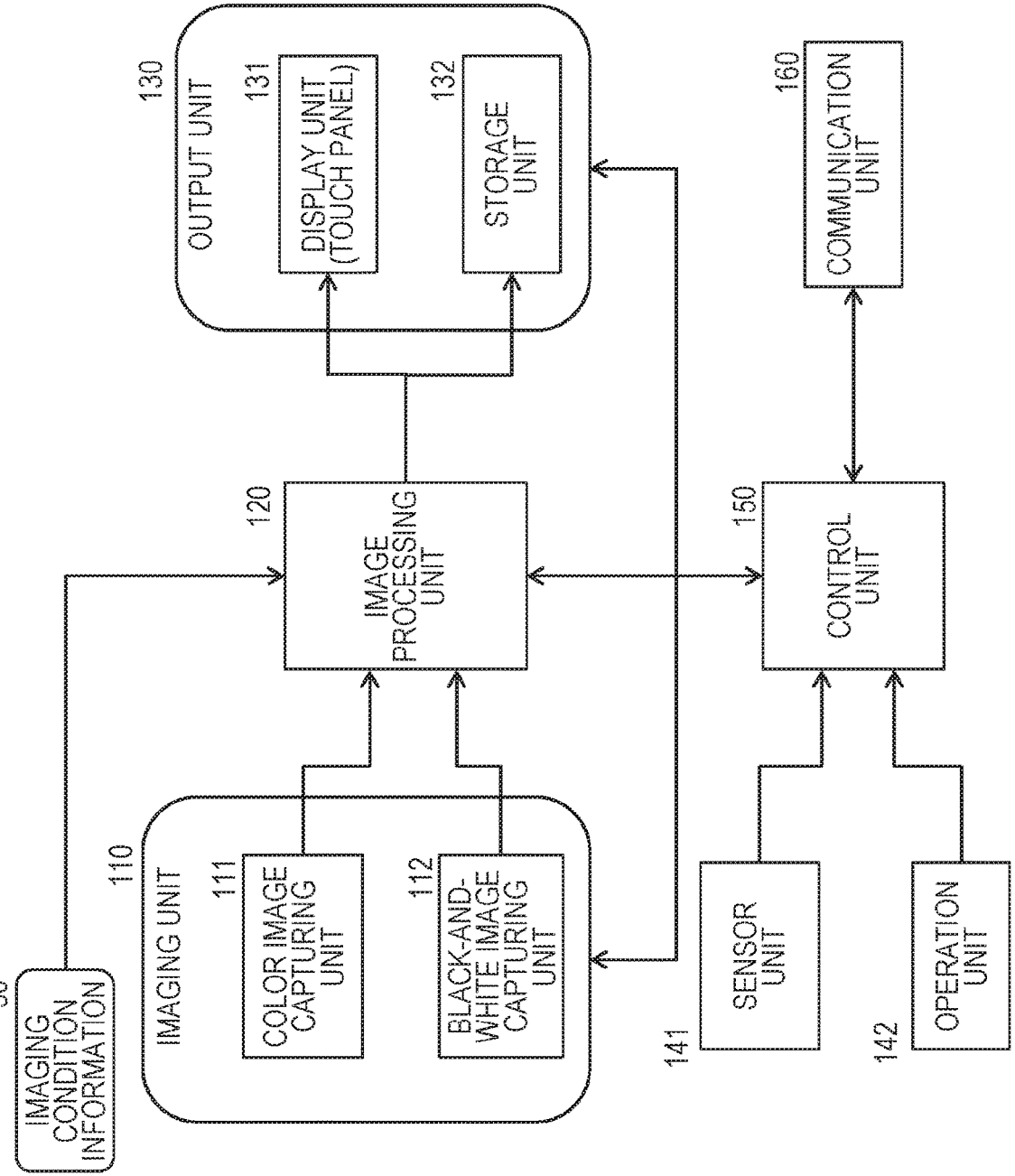
FIG. 2 is a diagram illustrating a configuration example of an image processing apparatus.

FIG. 2 shows a configuration example of a general twin-lens type image processing apparatus including a color image capturing unit 111 and a black-and-white image capturing unit 112 separately.

An image processing apparatus 100 includes the color image capturing unit 111, the black-and-white image capturing unit 112, and an image processing unit 120. The color image capturing unit 111 and the black-and-white image capturing unit 112 are included in an imaging unit 110. The image processing apparatus 100 also includes a display unit (touch panel) 131 and a storage unit 132 as an output unit 130 of an image processed by the image processing unit 120.

Moreover, the image processing apparatus 100 includes a sensor unit 141, an operation unit 142, a control unit 150, and a communication unit 160.

The color image capturing unit 111 and the black-and-white image capturing unit 112 are provided on the same surface side of the image processing apparatus 100 as shown in FIG. 1B. The color image capturing unit 111 and the black-and-white image capturing unit 112 each include an imaging element such as a complementary metal oxide semiconductor (CMOS) image sensor. The color image capturing unit 111 and the black-and-white image capturing unit 112 each perform photoelectric conversion of light captured by a lens (not shown). Thus, the color image capturing unit 111 and the black-and-white image capturing unit 112 each generate image data of a captured image, and output the image data to the image processing unit 120. Furthermore, there is a difference in characteristic between the color image capturing unit 111 and the black-and-white image capturing unit 112.

FIGS. 3A and 3B show an example of a pixel array of the imaging unit. FIG. 3A shows a pixel array of the black-and-white image capturing unit 112. All the pixels included in the black-and-white image capturing unit 112 are white (W) pixels that each output an electric signal based on the amount of incident light in the entire wavelength range of visible light. Therefore, the black-and-white image capturing unit 112 generates image data of a black-and-white image.

FIG. 3B shows a pixel array of the color image capturing unit 111. The color image capturing unit 111 includes a color filter including, for example, red (R) pixels, blue (B) pixels, and green (G) pixels arranged in a Bayer array. In the Bayer array, two green (G) pixels are diagonally located in each pixel unit of two-by-two pixels, and the rest of the pixels in each pixel unit correspond to a red (R) pixel and a blue (B) pixel. That is, the color image capturing unit 111 includes color pixels that each output an electric signal based on the amount of incident light of corresponding one of red, blue, and green color components. Therefore, the color image capturing unit 111 generates image data of a color image in which each pixel represents one of the three primary color (RGB) components.

The image processing unit 120 generates a composite image by using captured images obtained by the color image capturing unit 111 and the black-and-white image capturing unit 112. That is, the image processing unit 120 performs image processing by using the captured images obtained by the color image capturing unit 111 and the black-and-white image capturing unit 112, and generates a high-quality composite image of the respective captured images obtained by the color image capturing unit 111 and the black-and-white image capturing unit 112. Then, the image processing unit 120 outputs the generated composite image to the display unit (touch panel) 131 and the storage unit 132 in the output unit 130. Note that the configuration and operation of the image processing unit 120 will be described later in detail.

The sensor unit 141 includes a gyro sensor or the like, and detects a shake generated in the image processing apparatus 100. The sensor unit 141 outputs information on the detected shake to the control unit 150.

The communication unit 160 communicates with devices on a network such as a local area network (LAN) or the Internet.

The display unit (touch panel) 131 displays a captured image on the basis of image data supplied from the image processing unit 120, and also displays a menu screen, various application screens, and the like on the basis of an information signal from the control unit 150. Note that the display surface of the display unit (touch panel) 131 is configured as a touch panel such that a GUI function can be used.

The operation unit 142 includes operation switches and the like, generates an operation signal corresponding to a user operation, and outputs the operation signal to the control unit 150.

The storage unit 132 stores information generated by the image processing apparatus 100, such as image data supplied from the image processing unit 120, and various types of information to be used for executing communication and applications in the image processing apparatus 100.

The control unit 150 includes a central processing unit (CPU), a read only memory (ROM), a random access memory (RAM) (not shown), and the like. The control unit 150 executes a program stored in the ROM or the RAM to control the operation of each unit such that operation is performed in the image processing apparatus 100 according to a user operation performed on the touch panel included in the display unit (touch panel) 131 or on the operation unit 142.

Note that the image processing apparatus 100 is not limited to an apparatus with the configuration shown in FIG. 2, and may also include, for example, an encoding processing unit that encodes image data and stores the encoded image data in the storage unit 132, a resolution conversion unit that adjusts the image data to the resolution of the display unit, and the like.

2. Composite Image Generation Process to be Performed by Image Processing Unit

Next, described below is a composite image generation process to be performed by the image processing unit 120.

The image processing unit 120 shown in FIG. 2 performs an image composition process by using a black-and-white image obtained by the black-and-white image capturing unit 112 and a color image obtained by the color image capturing unit 111.

FIG. 4 is a diagram for illustrating image quality obtained by an image composition process in which a black-and-white image is used as a reference image. For example, in a case where image composition is performed to generate a composite image, after position adjustment is performed by use of a black-and-white image as a reference image such that the position of a color image coincides with the position of the black-and-white image, it is possible to precisely reproduce brightness according to the characteristics of a lens and a sensor used in the black-and-white image capturing unit 112.

Meanwhile, FIG. 5 is a diagram for illustrating image quality obtained by an image composition process in which a color image is used as a reference image. For example, in a case where image composition is performed to generate a composite image, after position adjustment is performed by use of a color image as a reference image such that the position of a black-and-white image coincides with the position of the color image, no color shift is caused in the composite image. This is because the color image is used as a reference image. Thus, it is possible to precisely reproduce brightness according to the characteristics of the lens and the sensor used in the black-and-white image capturing unit 112.

However, the black-and-white image capturing unit 112 and the color image capturing unit 111 are based on different viewpoints. Thus, the risk of color shift is higher in a near view than in a distant view. Furthermore, the number of occlusion regions increases in a near view as compared to a distant view.

The occlusion region refers to a region that is captured only in one of images and not captured in the other image due to, for example, an obstacle close to the imaging unit and the like.

FIG. 6 shows an occlusion region in the case of using, as a reference image, a black-and-white image obtained by the black-and-white image capturing unit 112. In a case where occlusion is caused by parallax, there are no image data corresponding to the occlusion region in a color image obtained by the color image capturing unit 111. Therefore, color information is missing in the occlusion region in a composite image generated by the image composition process. Moreover, there is also a possibility that, compared to a pixel in a distant view, a pixel in a near view corresponding to a target pixel in one of captured images may be beyond the search range of parallax detection, and accordingly, a parallax vector cannot be calculated. Therefore, a composite image obtained by the image composition process may have a lower image quality than a color image obtained by the color image capturing unit 111 in some cases.

Furthermore, the black-and-white image capturing unit 112 has higher sensitivity than the color image capturing unit 111 using a color filter. Thus, when the brightness of a subject increases, pixel saturation is more likely to occur in the black-and-white image capturing unit 112 than in the color image capturing unit 111. Thus, when the number of saturated pixels increases in a black-and-white image, a color image having a deteriorated image quality is obtained as a composite image, in which the high-brightness portion of the subject is more saturated than in a color image obtained by the color image capturing unit 111.

For this reason, the image processing unit 120 performs image composition determination as to whether or not image quality deteriorates due to parallax or pixel saturation, on the basis of captured images. The image processing unit 120 generates either of the following two types of composite images according to the result of image composition determination:

a composite image using a color image obtained by the color image capturing unit 111, as a reference image, and a composite image using a black-and-white image obtained by the black-and-white image capturing unit 112, as a reference image.

Figure 7:
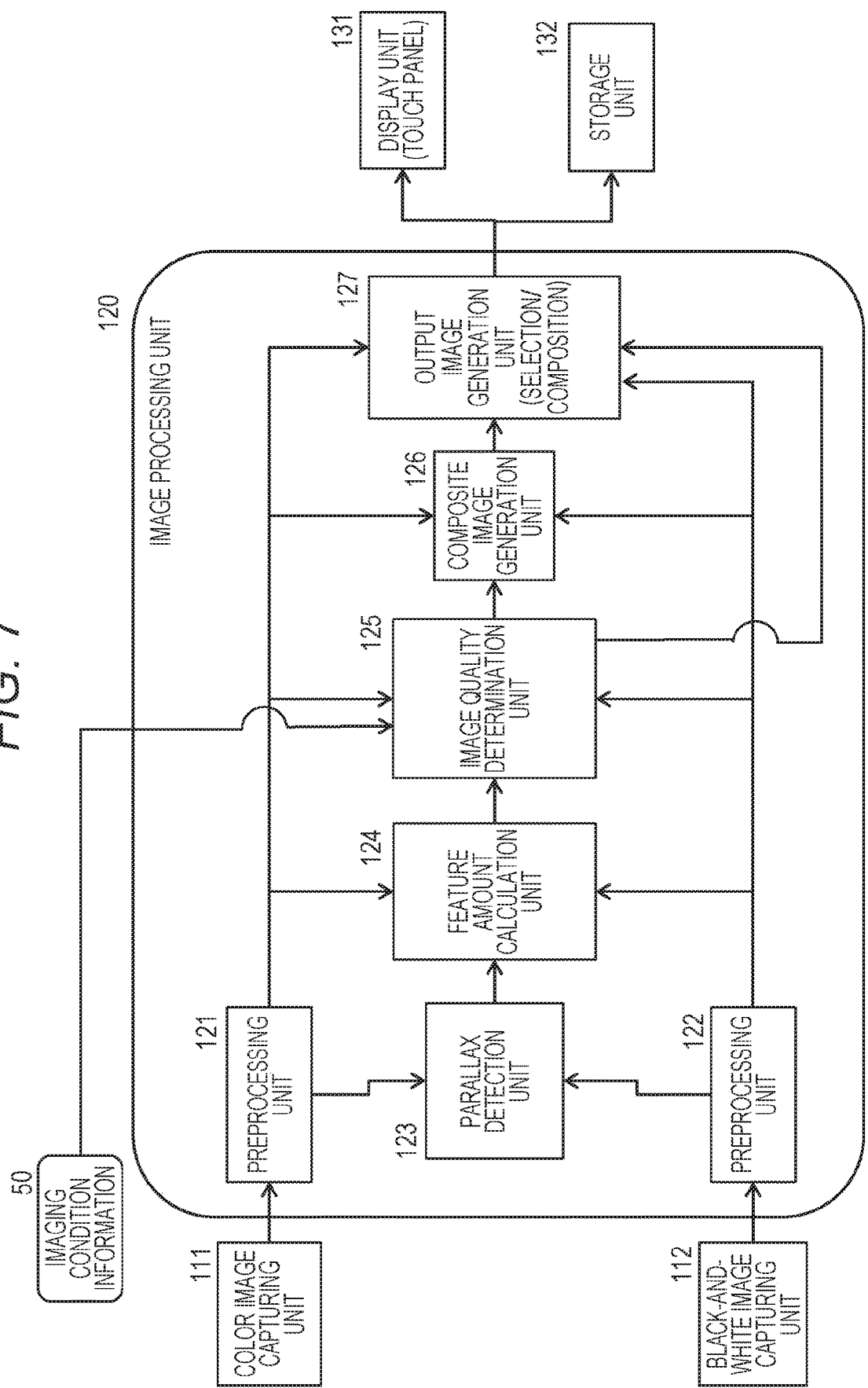
FIG. 7 is a diagram illustrating a configuration example of an image processing unit.

FIG. 7 is a diagram showing a detailed configuration example of the image processing unit 120.

The image processing unit 120 includes preprocessing units 121 and 122, a parallax detection unit 123, a feature amount calculation unit 124, an image quality determination unit 125, a composite image generation unit 126, and an output image generation unit (selection/composition) 127.

The preprocessing units 121 and 122 perform image correction processing such as lens distortion correction, defective pixel correction, and white balance adjustment on image data of captured images obtained by the color image capturing unit 111 and the black-and-white image capturing unit 112. The corrected image data are output to the parallax detection unit 123, the feature amount calculation unit 124, the image quality determination unit 125, the composite image generation unit 126, and the output image generation unit (selection/composition) 127.

The parallax detection unit 123 performs parallax detection on the basis of the black-and-white image data and the color image data supplied from the preprocessing units 121 and 122.

The black-and-white image capturing unit 112 and the color image capturing unit 111 capture images from different viewpoint positions as shown in FIG. 1B. Therefore, captured images obtained by the black-and-white image capturing unit 112 and the color image capturing unit 111 have parallax.

The parallax detection unit 123 detects a parallax in pixel units by performing a corresponding point detection process such as block matching. Information on the detection is output to the feature amount calculation unit 124.

The feature amount calculation unit 124 inputs parallax information in pixel units or image area units of two pieces of image data detected by the parallax detection unit 123, and calculates image feature amounts, specifically, the partial distribution of parallax, the size (occupancy rate) of an occlusion region, and the like.

A specific configuration example and processing of the feature amount calculation unit 124 will be described later.

Feature amount information on the feature amounts calculated by the feature amount calculation unit 124 is output to the image quality determination unit 125.

The image quality determination unit 125 determines the image quality and the like of a composite image on the basis of the feature amount information on the feature amounts calculated by the feature amount calculation unit 124. Specifically, the image quality determination unit 125 determines the image quality of, for example, the following images:

(a) a color image-based composite image, (b) a black-and-white image-based composite image, (c) a monocular color image captured by the color image capturing unit 111, and (d) a monocular black-and-white image captured by the black-and-white image capturing unit 112.

Results of the determination are output to the composite image generation unit 126 and the output image generation unit (selection/composition) 127.

The specific configuration and processing of the image quality determination unit 125 will also be described later.

On the basis of the results of determination of the image quality determination unit 125, the composite image generation unit 126 generates either of the following composite images:

(a) a color image-based composite image, and (b) a black-and-white image-based composite image.

A reference image refers to an image serving as a basis when a composite image is generated.

In a case where a color image is set as a reference image, the composite image generation unit 126 performs pixel value correction based on brightness information obtained from a black-and-white image by using, as a base, the color image data supplied from the preprocessing unit 121, and generates a composite image.

Meanwhile, in a case where a black-and-white image is set as a reference image, the composite image generation unit 126 performs pixel value correction based on color information obtained from a color image by using, as a base, the black-and-white image data supplied from the preprocessing unit 122, and generates a composite image.

The image quality determination unit 125 determines which of the following two types of composite images may be a high-quality composite image:

a composite image generated by use of a black-and-white image as a reference image, and a composite image generated by use of a color image as a reference image.

Hereinafter, a specific example of the determination process will be described.

The image quality determination unit 125 uses the feature amount information input from the feature amount calculation unit 124 to determine which of a color image and a black-and-white image is to be set as a reference image.

Specifically, on the basis of, for example, parallax information of the two pieces of image data and occlusion region detection information, the image quality determination unit 125 determines which of a color image and a black-and-white image is to be set as a reference image.

An example of the reference image determination process will be described with reference to FIG. 8.

Figure 8:
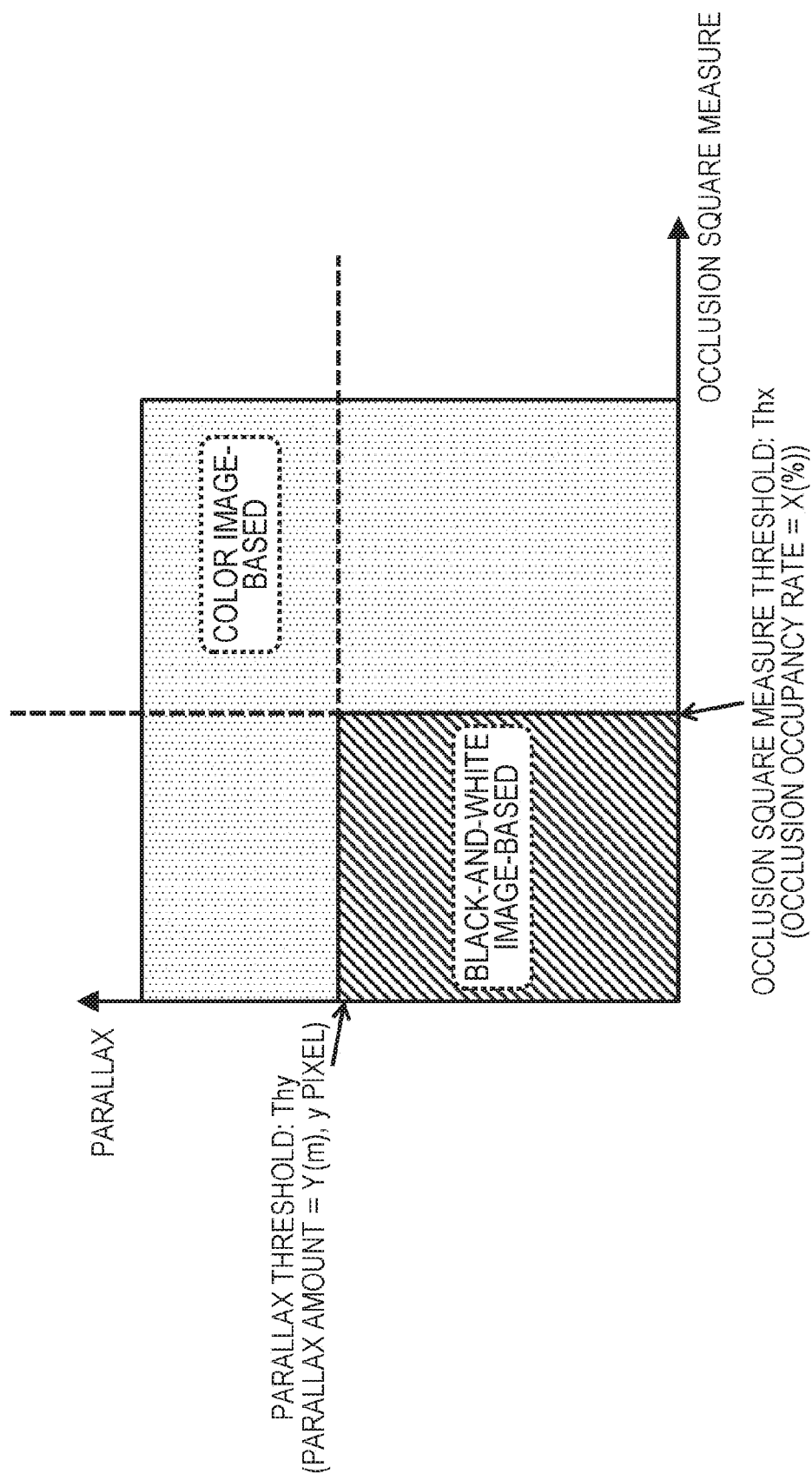
FIG. 8 is a diagram illustrating an example of a reference image determination process.

Occlusion square measure is on the horizontal axis, and parallax is on the vertical axis in a graph shown in FIG. 8.

The occlusion square measure on the horizontal axis corresponds to the occupancy rates (%) of the occlusion regions included in the image areas of two images of the color image captured by the color image capturing unit 111 and the black-and-white image captured by the black-and-white image capturing unit 112.

The parallax on the vertical axis is parallax (for example, the number of pixels) of the two images of the color image captured by the color image capturing unit 111 and the black-and-white image captured by the black-and-white image capturing unit 112.

The reference image determination unit 124 first calculates the above-described occlusion region occupancy rate and parallax in units of divided areas obtained as a result of dividing the image.

This processing will be described with reference to FIG. 9.

Figure 9:
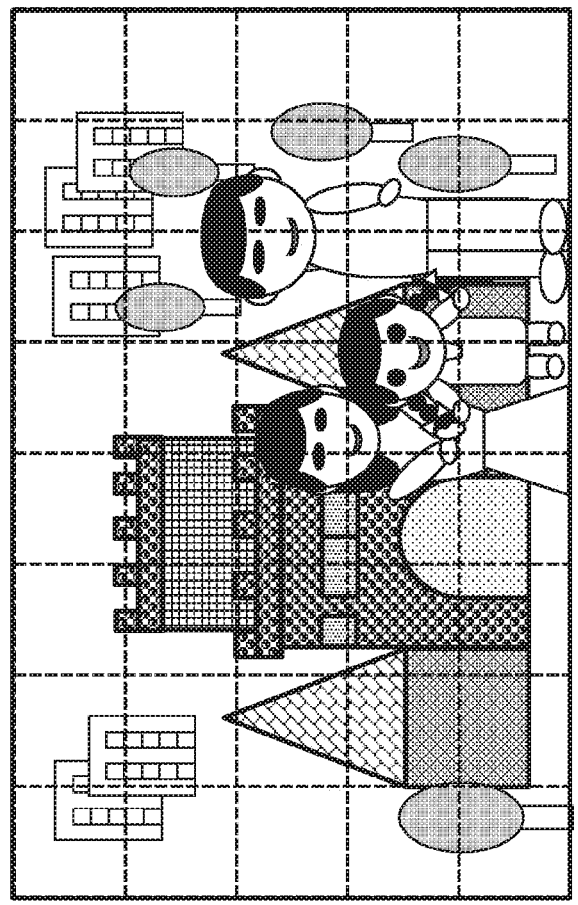
FIG. 9 is a diagram illustrating an example of the reference image determination process.

FIG. 9 shows a color image captured by the color image capturing unit 111 or a black-and-white image captured by the black-and-white image capturing unit 112.

The reference image determination unit 124 selects either of the two images, and sets a plurality of divided areas in the selected image. Areas divided by dotted lines in FIG. 9 correspond to the divided areas.

The reference image determination unit 124 calculates an occlusion region occupancy rate and a parallax (average value) for each divided area.

For example, 40 (8×5=40) divided areas are set in the example shown in FIG. 9, so that 40 occlusion region occupancy rates and 40 parallaxes (average values) are calculated.

The 40 occlusion region occupancy rates and the 40 parallaxes (average values) are plotted on the graph shown in FIG. 8.

That is, coordinates (x,y) are plotted on the graph shown in FIG. 8 when x and y are defined as follows:
occlusion region occupancy rate=x, and
parallax (average value)=y.

With this process, if, for example, 50% or more of the coordinates are included in a color image-based area, a color image is used as a reference image.

Furthermore, if 50% or more of the coordinates are included in a black-and-white image-based area, a black-and-white image is used as a reference image.

The reference image determination unit 124 determines a reference image by such a process.

Note that the above-described processing example is an example, and other processing is also possible.

For example, it is also possible to perform a process of determining a reference image while a greater weight is set on a divided area in the central region of an image such that the occlusion region occupancy rate and parallax (average value) of the central region are more largely reflected in determination of the reference image.

Alternatively, a process may be performed in which a reference image is determined while a higher weight is set on a divided area where a face region has been detected.

As understood from the graph shown in FIG. 8, a black-and-white image is used as a reference image in a case where the occlusion square measure occupancy rate is lower than a threshold Thx and the parallax is lower than a parallax threshold Thy.

Meanwhile, a color image is used as a reference image in a case where the occlusion square measure occupancy rate is equal to or higher than the threshold Thx or the parallax is equal to or higher than the parallax threshold Thy.

The image quality determination unit 125 determines a reference image by such a process.

In a case where the occlusion square measure occupancy rate is small and the parallax is small, it is possible to generate a high-quality image by applying precise brightness information of the black-and-white image to the entire image while using the black-and-white image as a reference image.

That is, in a case where the occlusion square measure occupancy rate is small and the parallax is small, an area is small in which color information cannot be obtained from the color image due to occlusion. In addition, a color shift is less likely to be caused by parallax. Accordingly, there is generated a high-quality black-and-white image-based composite image by application of precise brightness information of the black-and-white image to the entire image while the black-and-white image is used as a reference image.

Meanwhile, in a case where the occlusion square measure occupancy rate is large or the parallax is large, there is a possibility that an area is large in which color information cannot be obtained from the color image due to occlusion, or that a problem of a color shift is caused by parallax in a large area. Accordingly, a color image-based composite image is generated while the color image is used as a reference image, so as to reduce these problems.

Note that there is performed a composite image generation process to which the brightness information of the black-and-white image is applied, also in generating a color image-based composite image.

Note that the reference image determination process described with reference to FIGS. 8 and 9 is an example, and the image quality determination unit 125 uses other image feature amounts to determine the image quality of the following images:
(a) a color image-based composite image,
(b) a black-and-white image-based composite image,
(c) a monocular color image captured by the color image capturing unit 111, and
(d) a monocular black-and-white image captured by the black-and-white image capturing unit 112.

Information on results of the determination is also output to the output image generation unit (selection/composition) 127. On the basis of the determination results, the output image generation unit (selection/composition) 127 selects or combines any of the following images generated by the composite image generation unit 126, and outputs the selected or combined image to the display unit (touch panel) 131 and the storage unit 132:

(a) a color image-based composite image, (b) a black-and-white image-based composite image, (c) a monocular color image captured by the color image capturing unit 111, or (d) a monocular black-and-white image captured by the black-and-white image capturing unit 112.

Note that in a case where a moving image is captured and output, the output image generation unit (selection/composition) 127 performs a process in which the images (A) to (D) described above are gradually switched.

For example, in the case of switching from a color image to a color image-based composite image and outputting the color image-based composite image, the output image generation unit (selection/composition) 127 sequentially outputs image frames while gradually changing the composition ratio of each image from an image of 100% color image to an image of 100% color image-based composite image. This process makes it difficult for an image observer to detect the switching of the images.

Figure 10:
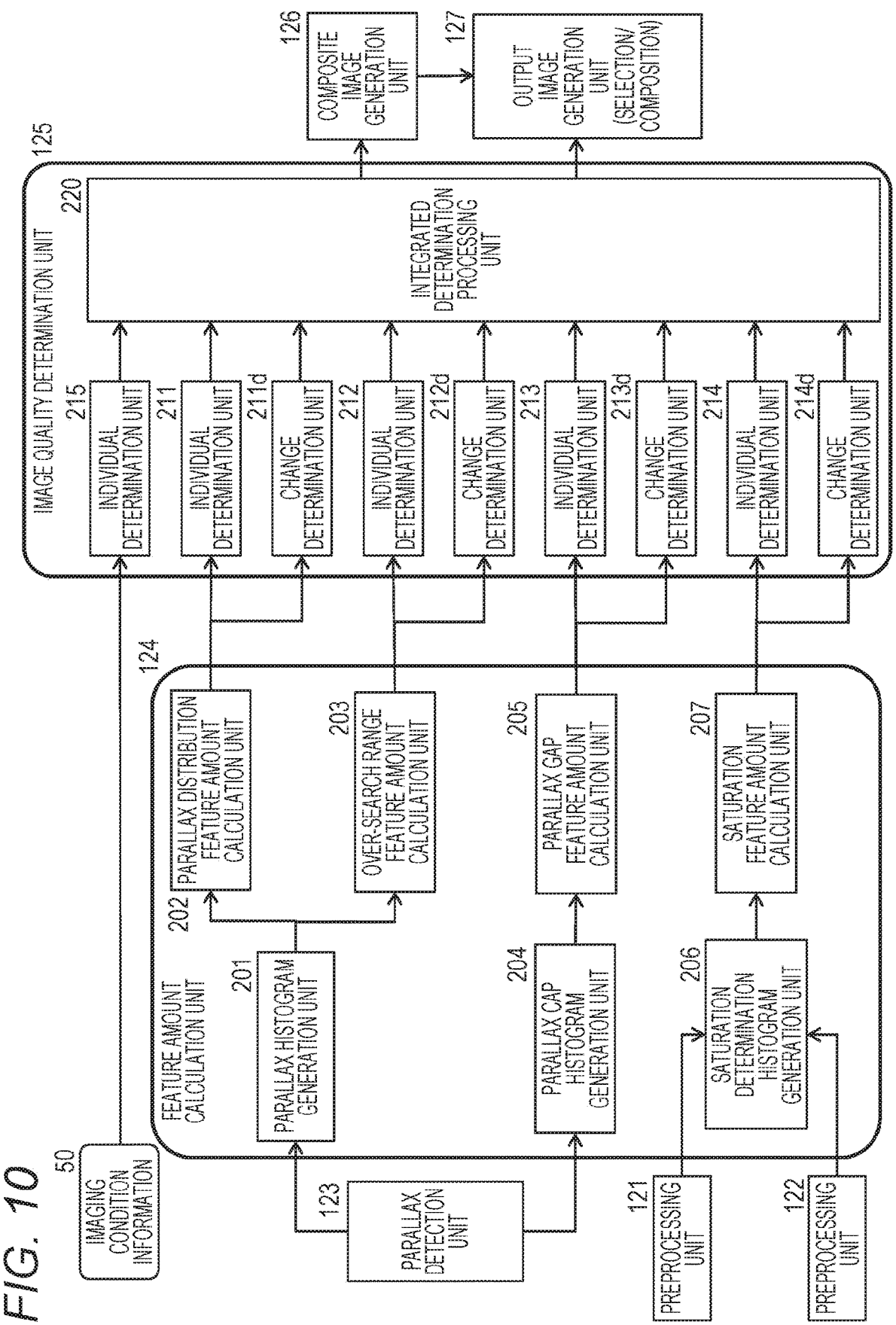
FIG. 10 is a diagram illustrating a detailed configuration and a processing example of a feature amount calculation unit and an image quality determination unit.

Next, described below is specific examples of the configurations of the feature amount calculation unit 124 and the image quality determination unit 125. FIG. 10 shows examples of the configurations of the feature amount calculation unit 124 and the image quality determination unit 125.

The feature amount calculation unit 124 calculates image feature amounts for determining image quality deterioration due to parallax and pixel saturation. The feature amount calculation unit 124 includes a parallax histogram generation unit 201, a parallax distribution feature amount calculation unit 202, an over-search range feature amount calculation unit 203, a parallax gap histogram generation unit 204, and a parallax gap feature amount calculation unit 205, as functional blocks that calculate image feature amounts for determining image quality deterioration due to parallax. Furthermore, the feature amount calculation unit 124 includes a saturation determination histogram generation unit 206 and a saturation feature amount calculation unit 207, as functional blocks that calculate an image feature amount for determining image quality deterioration due to pixel saturation.

The parallax histogram generation unit 201 generates a parallax histogram by using a parallax vector calculated for each pixel in a calculation target area. The parallax distribution feature amount calculation unit 202 calculates a parallax distribution feature amount FVfsd, which is a statistic indicating the feature of parallax distribution, from the parallax histogram generated by the parallax histogram generation unit 201.

The over-search range feature amount calculation unit 203 calculates an over-search range feature amount FVosr indicating the ratio of the frequency of the occurrences of a parallax exceeding a preset search range (over search range counter) to total frequency (counter), from the parallax histogram generated by the parallax histogram generation unit 201. The over-search range feature amount calculation unit 203 performs an arithmetic operation of equation (1) below by using the parallax histogram to calculate the over-search range feature amount FVosr.

$$FVosr = over\_search\_range\_counter/counter * 100 \qquad (1)$$

Thus, if the over-search range feature amount calculation unit 203 calculates the over-search range feature amount FVosr, it is possible to determine whether or not a subject that causes a large parallax has been imaged, on the basis of the over-search range feature amount FVosr. That is, it is possible to determine the state of generation of an area where occlusion occurs.

The parallax gap histogram generation unit 204 generates a parallax gap histogram.

FIG. 11A is a diagram illustrating a parallax difference absolute value to be used for generating a parallax gap histogram. The parallax gap histogram generation unit 204 calculates a parallax PV1 and a parallax PV2 to calculate a parallax difference absolute value PVapd which is the absolute value of a parallax difference between the parallaxes PV1 and PV2. As shown in FIG. 11A, the parallax PV1 is a parallax in a position at a distance corresponding to pixels of "−(PARALLAX_DIFF_DISTANCE/2)" horizontally from a target pixel position in the calculation target area. The parallax PV2 is a parallax in a position at a distance corresponding to pixels of "(PARALLAX_DIFF_DISTANCE/2)" horizontally from the target pixel position.

The parallax difference absolute value PVapd represented by equation (2) below is calculated. Note that the parallax gap distance (PARALLAX_DIFF_DISTANCE) is set in advance.

$$PVapd = ABS(PV1 - PV2) \qquad (2)$$

In a case where, for example, subjects are substantially on the same plane, the difference between the parallax PV1 and the parallax PV2 is small. Thus, the value of the parallax difference absolute value PVapd is small. Furthermore, in a case where, for example, distances to subjects are different and the target pixel is at a boundary between the subjects at different distances, the difference between the parallax PV1 and the parallax PV2 is large. Thus, the value of the parallax difference absolute value PVapd is large. The parallax gap histogram generation unit 204 generates a parallax gap histogram that is a histogram of the parallax difference absolute value PVapd calculated by using each pixel of the calculation target area as a target pixel. Note that FIG. 11B shows an example of a parallax gap histogram.

The parallax gap feature amount calculation unit 205 calculates a parallax gap feature amount FVpd from the parallax gap histogram generated by the parallax gap histogram generation unit 204. The parallax gap feature amount calculation unit 375 calculates the parallax gap feature amount FVpd indicating the ratio of the frequency of the occurrences of a parallax gap equal to or larger than a preset maximum parallax gap distance (large_parallax_diff_counter) to total frequency (counter), from the parallax gap histogram. The parallax gap feature amount calculation unit 375 performs an arithmetic operation of equation (3) by using the parallax gap histogram to calculate the parallax gap feature amount FVpd.

$$FVpd = large\_parallax\_diff\_counter/counter * 100 \qquad (3)$$

Thus, the parallax gap feature amount FVpd calculated by the parallax gap feature amount calculation unit 205 indicates the proportion of pixels where the maximum parallax gap distance is generated. Here, a parallax gap is small for subjects on the same plane, and a parallax gap is large at a boundary portion between images of subjects at different distances. Therefore, it is possible to determine the state of generation of a boundary between images of subjects at significantly different distances.

The saturation determination histogram generation unit 206 generates a pixel value histogram representing the frequency (number of pixels) of each pixel value on the basis of the black-and-white image data supplied from the preprocessing unit 122. Furthermore, the saturation determination histogram generation unit 206 generates brightness data by color space conversion of the color image data supplied from the preprocessing unit 121, and generates a pixel value histogram representing the frequency (number of pixels) of each pixel value on the basis of the generated brightness data.

The saturation feature amount calculation unit 207 calculates a saturation feature amount FVsat on the basis of the brightness value histogram generated by the saturation determination histogram generation unit 206.

The image quality determination unit 125 performs a process of determining which of the following four types of images has the highest image quality on the basis of the image feature amounts calculated by the feature amount calculation unit 124 and imaging condition information 50 obtained from the control unit and the like:

(a) a color image-based composite image,
(b) a black-and-white image-based composite image,
(c) a monocular color image captured by the color image capturing unit 111, and
(d) a monocular black-and-white image captured by the black-and-white image capturing unit 112.

Information on the determination is output to the composite image generation unit 126 and the output image generation unit (selection/composition) 127.

Furthermore, the image quality determination unit 125 determines the speed of switching the above-described images (a) to (d) on the basis of the amount of change, in a time direction, of the image feature amounts calculated by the feature amount calculation unit 124.

For example, in a case where the amount of change exceeds a change amount threshold in any of individual determination results supplied from change amount determination units 211d to 214d, the switching speed is set to a speed higher than a predetermined speed set in advance. In other cases, a specified switching speed shall be used.

Information on the switching speed is output to the output image generation unit (selection/composition) 127.

The image quality determination unit 125 includes individual determination units 211 to 215, the change amount determination units 211d to 215d, and an integrated determination processing unit 220, as functional blocks relating to determination as to whether or not image quality deteriorates and the amount of change of the image feature amount in the time direction.

The individual determination unit 211 determines the image quality of a composite image or the like on the basis of the parallax distribution feature amount calculated by the parallax distribution feature amount calculation unit 202. The individual determination unit 211 compares the parallax distribution feature amount FVfsd with a determination threshold Thfsd set in advance for the parallax distribution feature amount. In a case where the parallax distribution feature amount FVfsd is larger than the determination threshold Thfsd, the individual determination unit 211 determines that the image quality of the composite image deteriorates. The individual determination unit 211 outputs an individual determination result to the integrated determination processing unit 220.

The change amount determination unit 211d calculates a temporal change amount (FVfsd(i)−FVfsd(i−1)) of the parallax distribution feature amount calculated by the parallax distribution feature amount calculation unit 202. Note that "i" indicates a frame for which the image quality determination unit 125 determines whether or not image quality deteriorates. The change amount determination unit 211d compares the absolute value of the calculated change amount with a preset change amount threshold Thdfsd, and outputs the result of comparison to the integrated determination processing unit 220.

The individual determination unit 212 determines the image quality of a composite image or the like on the basis of the over-search range feature amount FVosr calculated by the over-search range feature amount calculation unit 203. The individual determination unit 212 compares the over-search range feature amount FVosr with a determination threshold Thosr set in advance for the over-search range feature amount. In a case where the over-search range feature amount FVosr is larger than the determination threshold Thosr, the individual determination unit 212 determines that the image quality of the composite image deteriorates. The individual determination unit 212 outputs an individual determination result to the integrated determination processing unit 220.

The change amount determination unit 212d calculates a temporal change amount (FVosr(i)−FVosr(i−1)) of the over-search range feature amount calculated by the over-search range feature amount calculation unit 203. Moreover, the change amount determination unit 212d compares the absolute value of the calculated change amount with a preset change amount threshold Thdosr, and outputs the result of comparison to the integrated determination processing unit 220.

The individual determination unit 213 determines the image quality of a composite image or the like on the basis of the parallax gap feature amount FVpd calculated by the parallax gap feature amount calculation unit 205. The individual determination unit 213 compares the parallax gap feature amount FVpd with a determination threshold Thpd set in advance for the parallax gap feature amount. In a case where the parallax gap feature amount FVpd is larger than the determination threshold Thpd, the individual determination unit 213 determines that the image quality of the composite image deteriorates. The individual determination unit 213 outputs an individual determination result to the integrated determination processing unit 220.

The change amount determination unit 213d calculates a temporal change amount (FVpd(i)−FVpd(i−1)) of the parallax gap feature amount calculated by the parallax gap feature amount calculation unit 205. The change amount determination unit 213d compares the absolute value of the calculated change amount with a preset change amount threshold Thdlpd, and outputs the result of comparison to the integrated determination processing unit 220.

The individual determination unit 214 determines the image quality of a composite image or the like on the basis of the saturation feature amount FVsat calculated by the saturation feature amount calculation unit 207. The individual determination unit 214 compares the saturation feature amount FVsat with a determination threshold Thsat set in advance for the saturation feature amount. In a case where the saturation feature amount FVsat is larger than the determination threshold Thsat, the individual determination unit 214 determines that the image quality of the composite image deteriorates. The individual determination unit 214 outputs an individual determination result to the integrated determination processing unit 220.

The change amount determination unit 214d calculates a temporal change amount (FVsat(i)−FVsat(i−1)) of the saturation feature amount calculated by the saturation feature amount calculation unit 207. The change amount determination unit 214d compares the absolute value of the calculated change amount with a preset change amount threshold Thdsat, and outputs the result of comparison to the integrated determination processing unit 220.

The individual determination unit 215 determines, for example, whether or not the image quality of the composite image deteriorates, on the basis of the imaging condition information 50. The imaging condition information 50 is imaging setting information such as brightness information, exposure information, subject distance information, focus and zoom information, and ISO sensitivity information, for example. The individual determination unit 215 compares the imaging condition information 50 with a determination threshold set in advance for the imaging condition information 50, and determines whether or not the image quality of the composite image deteriorates. The individual determination unit 215 outputs an individual determination result to the integrated determination processing unit 220.

The integrated determination processing unit 220 performs image determination by using the individual determination results supplied from the individual determination units 211 to 215. For example, the integrated determination processing unit 220 uses the individual determination results supplied from the individual determination units 211 to 215 to perform a process of determining which of the following four types of images has the highest image quality:

(a) a color image-based composite image, (b) a black-and-white image-based composite image, (c) a monocular color image captured by the color image capturing unit 111, and (d) a monocular black-and-white image captured by the black-and-white image capturing unit 112.

Results of the determination are output to the composite image generation unit 126 and the output image generation unit (selection/composition) 127.

Note that, specifically, in a case where, for example, a subject is at a short distance and the parallax between the color image and the black-and-white image is large, in a case where it is determined that there are many occlusion regions, or the like, it is determined that the image quality of the composite image deteriorates. In this case, there is performed, for example, a process of determining that the (c) monocular color image captured by the color image capturing unit 111 has the highest image quality.

Furthermore, the integrated determination processing unit 220 determines the speed of switching the above-described images (a) to (d) on the basis of the results of comparison between the change amounts and the change amount thresholds, supplied from the change amount determination units 211d to 215d. Information on the speed is output to the output image generation unit (selection/composition) 127.

On the basis of the result of determination of the image quality determination unit 125, the output image generation unit (selection/composition) 127 selects one of the following images, which is assumed to be an image with the highest quality, and outputs the selected image to the display unit (touch panel) 131 and the storage unit 132:

(a) a color image-based composite image, (b) a black-and-white image-based composite image, (c) a monocular color image captured by the color image capturing unit 111, and (d) a monocular black-and-white image captured by the black-and-white image capturing unit 112.

Furthermore, the integrated determination processing unit 220 determines the speed of switching the above-described images (a) to (d) on the basis of the results of comparison between the change amounts and the specified change amount thresholds, supplied from the change amount determination units 211d to 214d.

For example, in a case where the amount of change exceeds a change amount threshold in any of individual determination results supplied from change amount determination units 211d to 214d, the switching speed is set to a speed higher than a predetermined speed set in advance. In other cases, a specified switching speed shall be used.

Information on the switching speed is output to the output image generation unit (selection/composition) 127.

The output image generation unit (selection/composition) 127 performs a process of switching the above-described images (a) to (d) according to the switching speed. Specifically, when, for example, a moving image is captured, the speed of switching images is changed on the basis of the amount of change in a result detected from each imaged frame, so that the switching of images is performed slowly unless the image quality of an output image rapidly deteriorates.

Note that the output image generation unit (selection/composition) 127 performs the image switching process of the moving image, for example, as follows.

For example, in the case of performing a process of switching from a color image to a color image-based composite image, the switching is performed while the composition ratio of each image is gradually changed from an image of 100% color image to an image of 100% color image-based composite image.

This speed is set on the basis of the change amounts supplied from the change amount determination units 211d to 214d.

Note that FIG. 10 shows the configuration and processing of the image quality determination unit 125, in which there is performed a process of selecting an output image on the basis of the occlusion and the parallax between a color image captured by the color image capturing unit 111 and a black-and-white image captured by the black-and-white image capturing unit 112. However, this image determination process is an example, and it is also possible to adopt a configuration in which no high-quality image is selected on the basis of various other image features and imaging condition information.

3. Problem in Output Image Automatic Selection Process

In the above-described configuration of output image selection, that is, in the example of output image selection to be performed by the image quality determination unit 125 described with reference to, for example, FIG. 10, an output image is automatically selected on the basis of the occlusion and the parallax between a color image captured by the color image capturing unit 111 and a black-and-white image captured by the black-and-white image capturing unit 112.

However, there may be a user request to record an image different from the image selected by the image quality determination unit 125.

Furthermore, as described above, in a case where, for example, a subject is at a short distance and the parallax between the color image and the black-and-white image is large, in a case where it is determined that there are many occlusion regions, or the like, it is determined that the image quality of the composite image deteriorates. In this case, it is determined that "a monocular color image captured by the color image capturing unit 111" has the highest image quality.

As a result, the output image generation unit (selection/composition) 127 selects and outputs the "monocular color image captured by the color image capturing unit 111" on the basis of the result of determination of the image quality determination unit 125. That is, there is performed a process of displaying the "monocular color image captured by the color image capturing unit 111" on the display unit (touch panel) 131 and storing the "monocular color image captured by the color image capturing unit 111" in the storage unit 132.

Even in a case where a user starts to capture an image after setting a composite image generation mode to ON through the operation unit 142 or the touch panel included in the display unit (touch panel) 131 of the image processing apparatus 100, a composite image is not output and the "monocular color image captured by the color image capturing unit 111" is output if the result of determination of the image quality determination unit 125 indicates that the image quality of the composite image deteriorates.

The result of determination of the image quality determination unit 125 is not always correct in every situation.

For example, consider a case where a close subject is imaged in a dark environment such as at night.

FIG. 12 is a graph with subject distance on the horizontal axis and brightness on the vertical axis.

For example, in area A, that is, in a bright area with sufficient brightness, the image quality determination unit 125 determines that either a color image or a composite image is an image with the highest quality, and selectively outputs the image.

Furthermore, in the case of imaging with a subject distance equal to or larger than a predetermined threshold Th1 in area B, that is, in a dark environment such as at night or indoors with insufficient brightness, it is determined that a composite image obtained as a result of combining the brightness information of a black-and-white image with a color image has image quality higher than the color image, and the composite image is output.

However, in the case of imaging of a close subject with a subject distance lower than the predetermined threshold Th1 in area C, that is, in a dark environment such as at night or indoors with insufficient brightness, there is made feature amount determination such as determination that the parallax between a color image and a black-and-white image is large or determination that the number of occlusion regions increases. Thus, the image quality determination unit 125 determines that the image quality of a composite image deteriorates, and selects and outputs the "monocular color image captured by the color image capturing unit 111".

However, the brightness of the area C is insufficient, and the "monocular color image captured by the color image capturing unit 111" may not be a high-quality image.

That is, there is a possibility that a result as shown in FIGS. 13A and 13B may be obtained.

FIGS. 13A and 13B show examples of capturing a FIG. 13A monocular color image and a FIG. 13A composite image of close subjects captured with subject distances lower than the predetermined threshold Th1 in the area C shown in FIG. 12, that is, in a dark environment such as at night or indoors with insufficient brightness.

The FIG. 13A monocular color image is a dark image as a whole due to insufficient brightness. In contrast, the FIG. 13B composite image is an image generated as a result of combining the brightness information of a black-and-white image with a color image. Accordingly, the brightness information output in the FIG. 13B composite image is clearer than in the FIG. 13A monocular color image.

Thus, the result of determination of the image quality determination unit 125 is not always correct in every situation.

Furthermore, there are also cases where the user may desire to record any of a composite image, a monocular color image, and a monocular black-and-white image regardless of image quality.

Hereinafter, a configuration for solving this problem will be described.

4. Regarding Configuration and Processing of Image Processing Apparatus According to Present Disclosure that Outputs Guide Information for Obtaining High-Quality Composite Image and Also Enables Selection of Output Image Described below is the configuration and processing of an image processing apparatus according to the present disclosure that outputs auxiliary information such as guide information for obtaining a high-quality composite image, and also enables selection of an output image.

First, a specific processing example to be performed by the image processing apparatus according to the present disclosure will be described with reference to FIGS. 14A and 14B and subsequent drawings.

When displaying a captured image (through image) on the display unit (touch panel) 131, the image processing apparatus according to the present disclosure also displays each of the following information (auxiliary information).

FIG. 14A Composite image capturing guide information
FIG. 14B Composite image adaptation level indicator The FIG. 14A composite image capturing guide information is guidance information for capturing a high-quality composite image.

As shown in FIGS. 14A and 14B, for example, the following three types of display are switched according to imaging situations.

(Display example 1) proximity alert [The subject is too close]
(Display example 2) obstacle alert [There is an obstacle]
(Display example 3) composition process=ON [A good image can be captured]

(Display example 1) proximity alert [The subject is too close]

This display is provided in the following case. A subject is too close and thus, the parallax between a color image obtained by the color image capturing unit 111 and a black-and-white image obtained by the black-and-white image capturing unit 112 is large, so that it is determined that it is difficult to generate a composite image, that is, it is not possible to generate a high-quality composite image. Note that the determination is made by the image quality determination unit 125. The subject refers to, for example, a focus-controlled (focused) object in a captured image.

(Display example 2) obstacle alert [There is an obstacle]
This display is provided in the following case. There is an obstacle in front of the subject and thus, many occlusion regions are generated in each of the color image obtained by the color image capturing unit 111 and the black-and-white image obtained by the black-and-white image capturing unit 112, so that it is determined that it is difficult to generate a composite image, that is, it is not possible to generate a high-quality composite image. Note that the determination is made by the image quality determination unit 125.

(Display example 3) composition process=ON [A good image can be captured]
This display is provided in the following case. The subject is not too close, and there is no obstacle. In addition, the parallax is small, and the number of occlusion regions is also small. Accordingly, it is determined that it is possible to generate a high-quality composite image. Note that the determination is made by the image quality determination unit 125.

Note that the three types of display are automatically switched when the user moves a camera or changes the direction thereof.

For example, in a case where the display "(Display example 1) proximity alert [The subject is too close]" is provided, the proximity alert is switched to the display "obstacle alert" or "composition process=ON" when the user with the camera moves away from the subject.

Furthermore, in a case where the display "(Display example 2) obstacle alert [There is an obstacle]" is provided, the obstacle alert is switched to the display "composition process=ON" or "proximity alert" when the user with the camera changes the direction or position of the camera.

Meanwhile, the (B) composite image adaptation level indicator is an indicator that indicates a composite image capturing adaptation level regarding the current imaging condition.

As shown in the drawing, the indicator is set such that levels ranging from the level "composite image capturing unadaptable" to the level "composite image capturing adaptable (good)" are displayed. These levels are calculated by the image quality determination unit 125.

Moreover, the following three types of images are displayed on the (B) composite image adaptation level indicator, as types of optimal output image according to the composite image adaptation level:

a monocular color image,
a color image-based composite image, and
a black-and-white image-based composite image.

In the example shown in the drawing, the current composite image adaptation level corresponds to the level "composite image capturing adaptable (good)", so that it is indicated that the black-and-white image-based composite image is an optimal image to be generated.

The user can configure settings for the camera such that a high-quality composite image can be captured, by viewing these pieces of information displayed together with a captured image (through image) on the display unit (touch panel) 131, that is, the following information:

(A) composite image capturing guide information, and
(B) composite image adaptation level indicator.

Furthermore, the user can estimate the image quality of a composite image to be generated.

Moreover, the user can also select an image to be output, that is, an image to be output to the display unit (touch panel) 131 or an image to be stored in the storage unit 132.

Figure 15:
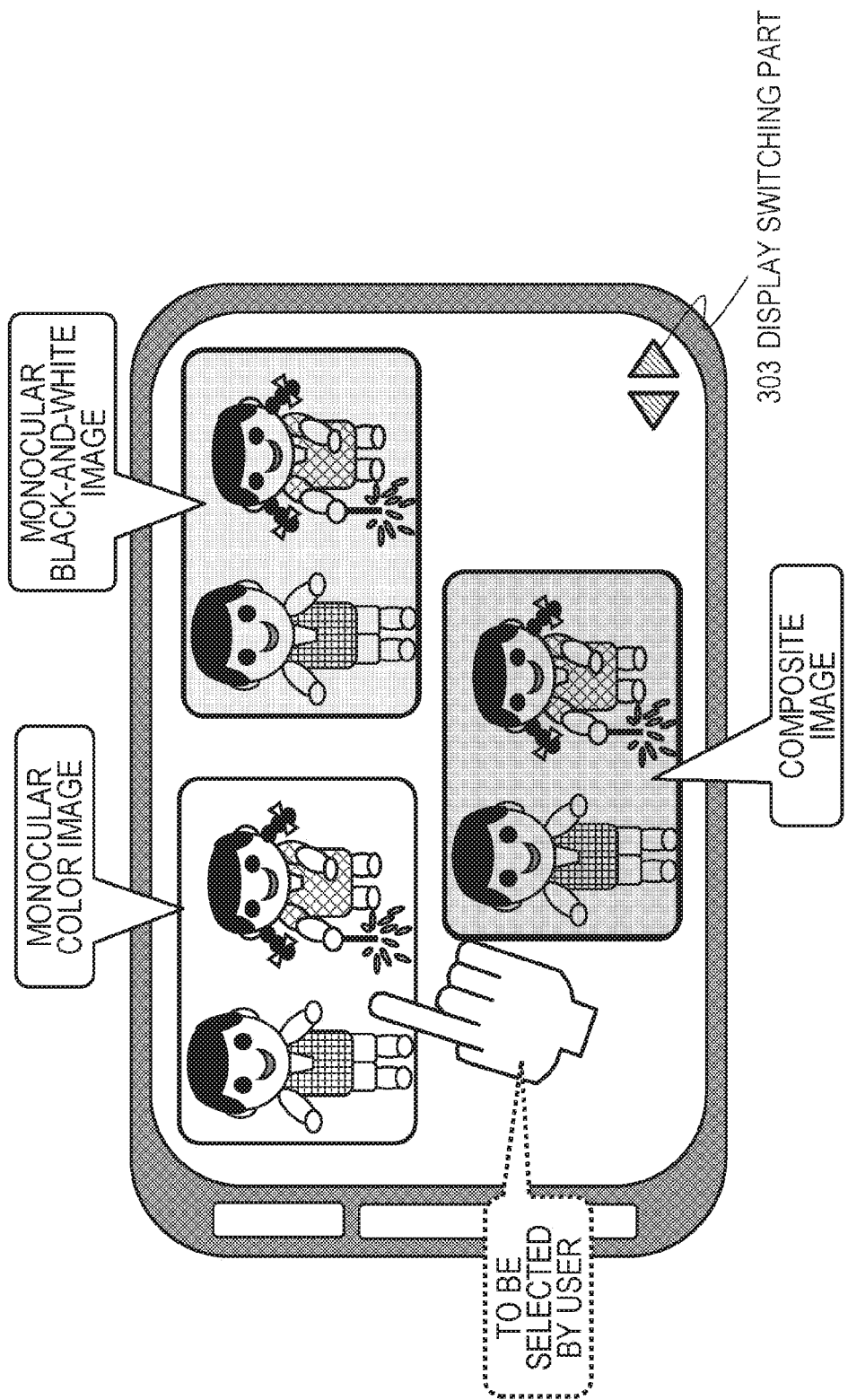
FIG. 15 is a diagram illustrating the process to be performed by the image processing apparatus according to the present disclosure.

For example, when a display switching part 303 shown in the drawing is operated (touched), the screen is switched to an output image selection screen shown in FIG. 15.

FIG. 15 shows an example in which the following three types of images are displayed in parallel:

a color image obtained by the color image capturing unit 111,
a black-and-white image obtained by the black-and-white image capturing unit 112, and
a composite image generated by the composite image generation unit 126 in the process of combining the color image and the black-and-white image.

The user can select, from among these three types of images, an output image, that is, an image to be output to the display unit (touch panel) 131 or an image to be stored in the storage unit 132, by touching any of the three types of images.

Figure 16:
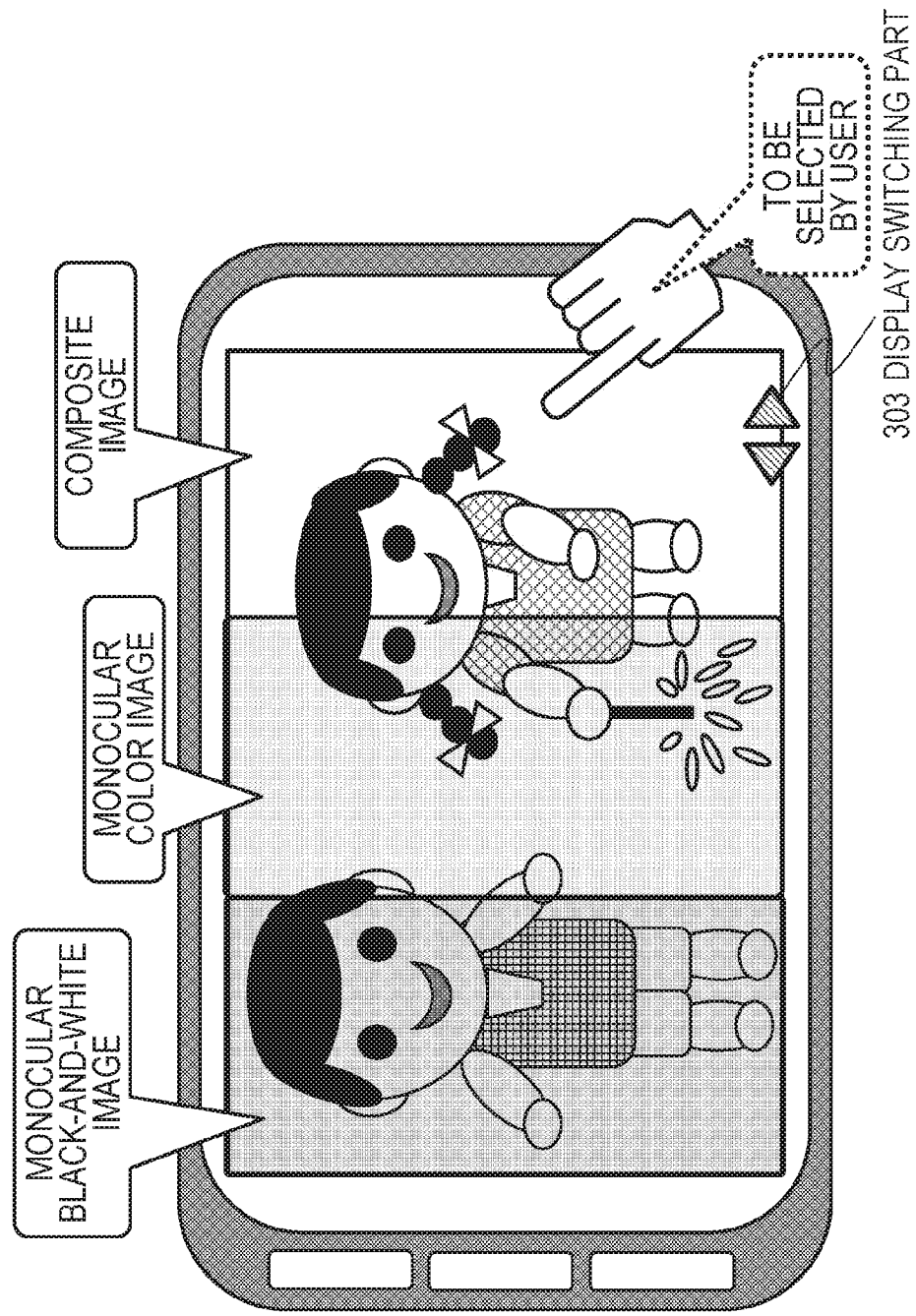
FIG. 16 is a diagram illustrating the process to be performed by the image processing apparatus according to the present disclosure.

Moreover, when the display switching part 303 shown in the drawing is operated (touched), the screen is switched to an output image selection screen shown in FIG. 16.

FIG. 16 shows an example in which a single image (through image) is divided into three, and the respective divided areas are displayed as the following three types of images:

a color image obtained by the color image capturing unit 111,
a black-and-white image obtained by the black-and-white image capturing unit 112, and
a composite image generated by the composite image generation unit 126 in the process of combining the color image and the black-and-white image.

That is, the three types of images are displayed in units of divided mound areas obtained by division of the single image into three in the example shown in FIG. 16.

The user can select, from among these images, the type of an output image, that is, an image to be output to the display unit (touch panel) 131 or an image to be stored in the storage unit 132, by touching any of these images.

The configuration of the image processing apparatus according to the present disclosure that implements the processing described with reference to FIGS. 14A, 14B, 15, and 16 will be described with reference to FIG. 17.

Figure 17:
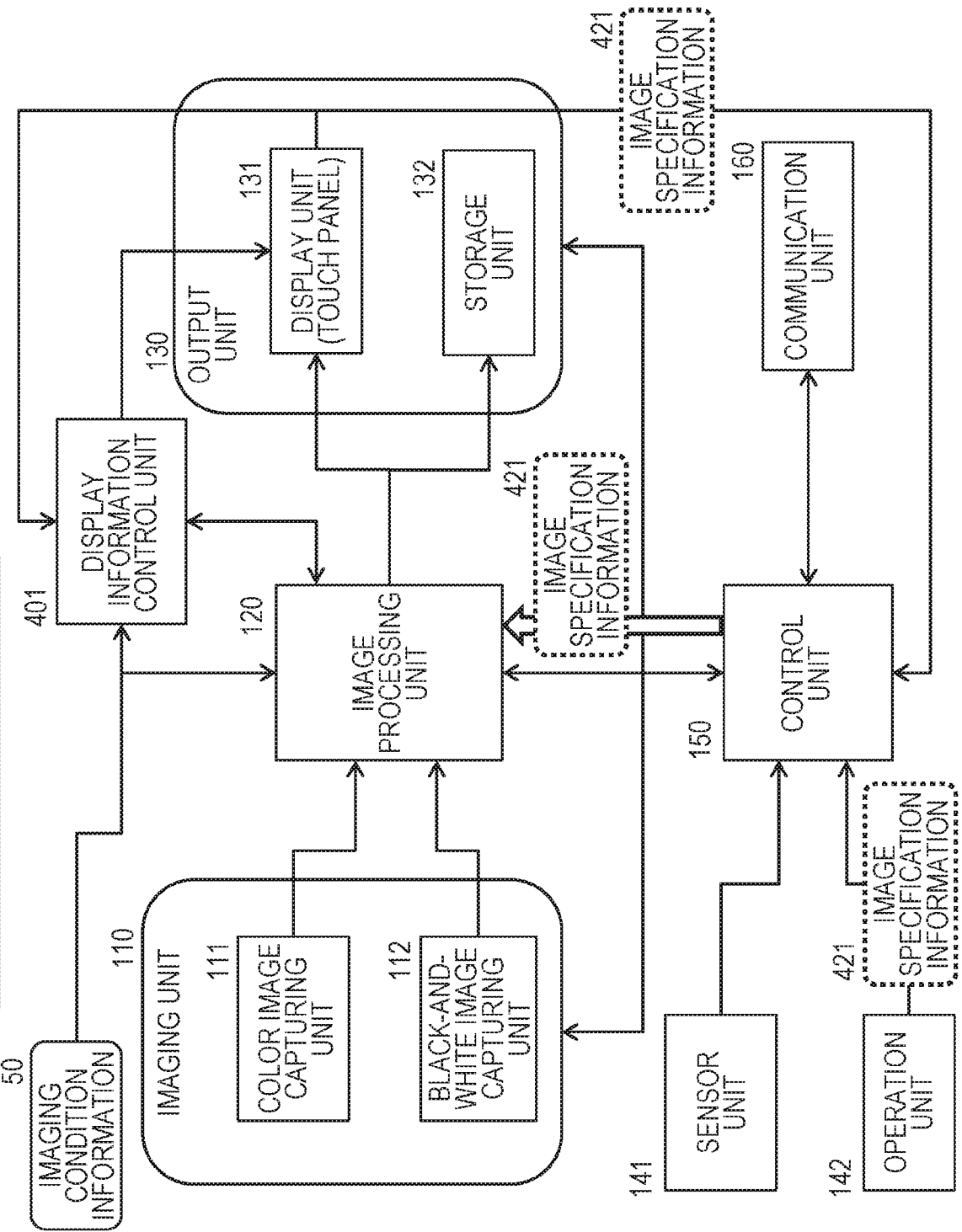
FIG. 17 is a diagram illustrating a configuration example of the image processing apparatus according to the present disclosure.

An image processing apparatus 400 shown in FIG. 17 includes a display information control unit 401 that is not included in the configuration of the image processing apparatus 100 described above with reference to FIG. 2.

The display information control unit 401 inputs the imaging condition information 50, and also inputs the result of image quality determination made by the image processing unit 120. Then, the display information control unit 401 generates and displays the following information described above with reference to FIGS. 14A and 14B on the display unit (touch panel) 131:

FIG. 14A composite image capturing guide information, and
FIG. 14B composite image adaptation level indicator.

Moreover, the display information control unit 401 inputs, to the image processing unit 120, information for specifying an image to be output to the display unit (touch panel) 131, and causes the image processing unit 120 to display images of various settings shown in, for example, FIGS. 14A, 14B 15 and 16.

Note that, as described above, the imaging condition information 50 is imaging setting information such as brightness information, exposure information, subject distance information, focus and zoom information, and ISO sensitivity information, for example.

Note that although the display information control unit 401 is shown as an independent constituent element in FIG. 17 for easy understanding of the description, the display information control unit 401 may be integrated with the control unit 150. That is, it is also possible to adopt a configuration in which the control unit 150 performs the processing of the display information control unit 401 to be described below.

Image specification information 421 input by the user via the touch panel of the display unit (touch panel) 131 or the operation unit 142 is then input to the image processing unit 120 via the control unit 150, so that an image to be output to the output unit 130, such as the display unit (touch panel) 131 and the storage unit 132, is selected.

Figure 18:
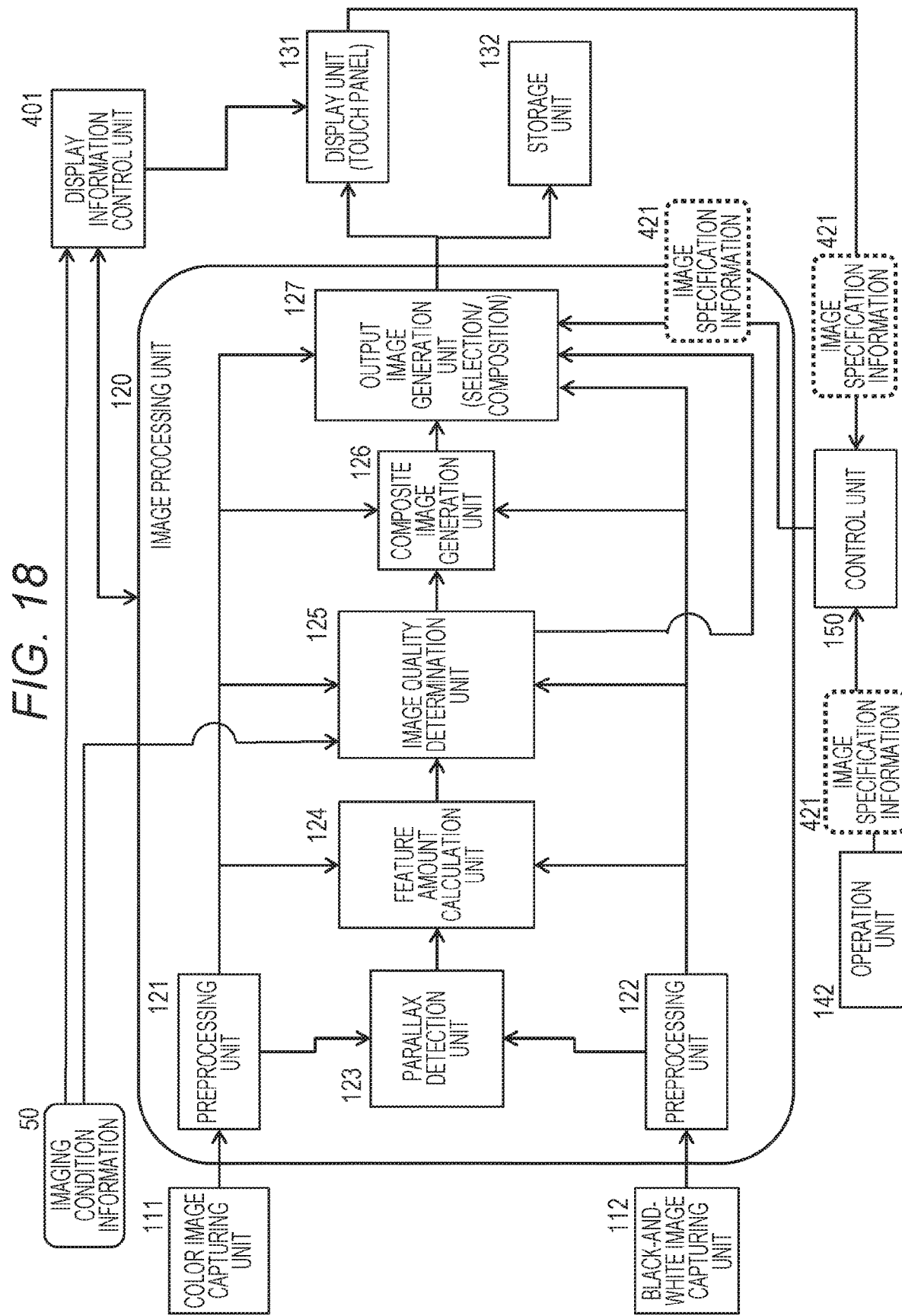
FIG. 18 is a diagram illustrating a configuration example of an image processing unit.

FIG. 18 shows a detailed configuration example of the image processing unit 120. This configuration is basically similar to the configuration described above with reference to FIG. 7.

However, the input/output of various types of information is performed between the image processing unit 120 and the display information control unit 401.

For example, information on the result of image quality determination made by the image quality determination unit 125 of the image processing unit 120 is output to the display image control unit 401.

Furthermore, a display image switching request is input from the display information control unit 401 to the output image generation unit 127 of the image processing unit 1230, so that various types of information and images described above with reference to FIGS. 14A, 14B 15 and 16 are output.

The image specification information 421 input by the user via the touch panel of the display unit (touch panel) 131 or the operation unit 142 is then input to the output image generation unit 127 of the image processing unit 120 via the control unit 150, so that an image to be output to the output unit 130, such as the display unit (touch panel) 131 and the storage unit 132, is selected.

Next, a state transition sequence of the image processing apparatus 400 according to the present disclosure will be described with reference to FIG. 19 and subsequent drawings.

Figure 19:
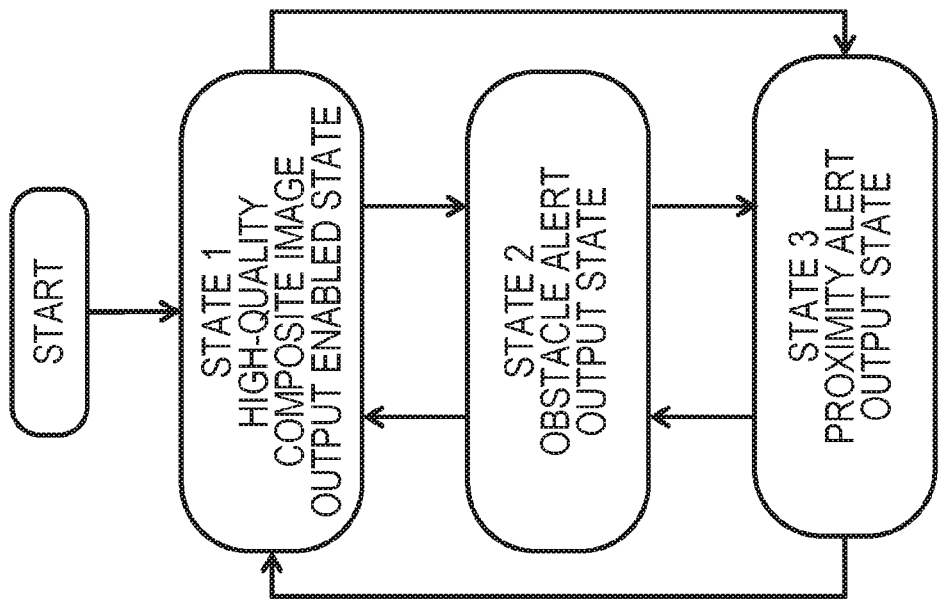
FIG. 19 is a diagram illustrating a state transition example of the image processing apparatus according to the present disclosure.

The image processing apparatus 400 according to the present disclosure makes transitions between three types of states shown in FIG. 19. That is, the image processing apparatus 400 makes transitions between the following states:

(State 1) high-quality composite image output enabled state, (State 2) obstacle alert output state, and (State 3) proximity alert output state.

These three states correspond to the display states of the three types of display examples of the composite image capturing guide information described above with reference to FIGS. 14A and 14B. That is, the display of (Display example 3) composition process=ON [A good image can be captured] is provided in the state of (State 1) high-quality composite image output enabled state.

Furthermore, the display of (Display example 2) obstacle alert [There is an obstacle] is provided in the state of (State 2) obstacle alert output state.

The display of (Display example 1) proximity alert [The subject is too close] is provided in the state of (State 3) proximity alert output state.

As shown in FIG. 19, the control unit 150 and the display information control unit 401 of the image processing apparatus 400 according to the present disclosure cause a transition between these three types of states according to the situation. For example, a state transition is made in units of image frames input via the imaging unit of the image processing apparatus or in units of a plurality of predetermined frames.

This transition sequence will be described with reference to flowcharts of FIG. 20 and subsequent drawings.

Figure 20:
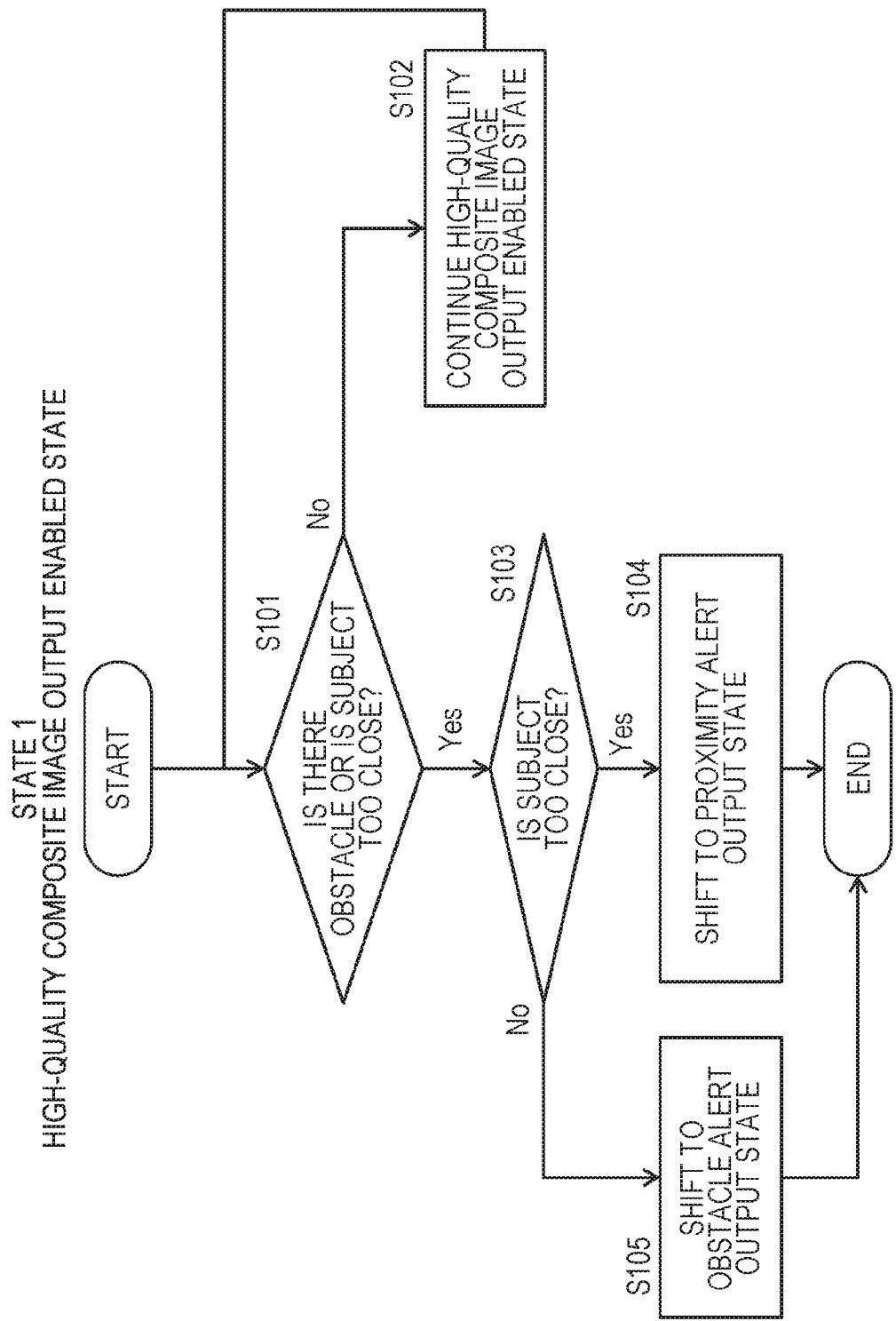
FIG. 20 shows a flowchart describing a sequence of a process to be performed by the image processing apparatus according to the present disclosure.

First, described below with reference to the flow shown in FIG. 20 is a process sequence in a case where the image processing apparatus 400 is in the state of (State 1) high-quality composite image output enabled state, that is, in a case where the information (Display example 3) composition process=ON [A good image can be captured], described with reference to FIGS. 14A and 14B, is displayed on the display unit (touch panel) 131.

Note that the processing shown in the flowcharts of FIG. 20 and the subsequent drawings can be performed according to a program stored in the storage unit of the image processing apparatus 400, and can be performed as program execution processing by a processor such as a CPU having a program execution function, for example.

Hereinafter, the processing of each step shown in the flowchart of FIG. 20 will be described.

(Step S101)

In a case where the control unit of the image processing apparatus (camera) is in "(State 1) high-quality composite image output enabled state", the control unit first determines, in step S101, whether or not there is an obstacle in front of a subject in an image captured by the camera or whether or not subject distance is too short.

The imaging condition information 50 or information obtained from the feature amount calculation unit 124 and the image quality determination unit 125 of the image processing unit 120 is necessary for these determinations.

Note that the subject refers to, for example, a focus-controlled (focused) object in a captured image.

Whether or not the subject distance is too short is determined, for example, on the basis of the amount of parallax between a color image and a black-and-white image. That is, the determination is made on the basis of, for example, determination as to whether or not the amount of parallax between the color image and the black-and-white image is smaller than a parallax threshold necessary for generating a high-quality composite image. Information necessary for this determination is obtained from the feature amount calculation unit 124 and the image quality determination unit 125 of the image processing unit 120.

Furthermore, whether or not there is an obstacle in front of the subject is determined on the basis of, for example, the square measure of an occlusion region included in each of the color image and the black-and-white image. That is, the determination is made on the basis of, for example, determination as to whether or not the occlusion region of each of the color image and the black-and-white image is smaller than a threshold necessary for generating a high-quality composite image. Information necessary for this determination is obtained from the feature amount calculation unit 124 and the image quality determination unit 125 of the image processing unit 120.

In a case where it is determined in step S101 that there is an obstacle in front of the subject in the image captured by the camera or that the subject distance is too short, the process proceeds to step S103.

In a case where determination of No is made in both of the above, the process proceeds to step S102.

(Step S102)

In a case where it is determined in step S101 that there is no obstacle in front of the subject in the image captured by the camera and that the subject distance is not too short, the process proceeds to step S102.

In step S102, "(State 1) high-quality composite image output enabled state" is continued.

Note that there is performed, in this state, a process of displaying the information "composition process=ON [A good image can be captured]" as the FIG. 14A composite image capturing guide information described above with reference to FIGS. 14A and 14B.

(Step S103)

Meanwhile, in a case where it is determined in step S101 that there is an obstacle in front of the subject in the image captured by the camera or that the subject distance is too short, the process proceeds to step S103.

In step S103, it is determined whether or not the subject distance is too short.

The imaging condition information 50 or information obtained from the feature amount calculation unit 124 and the image quality determination unit 125 of the image processing unit 120 is necessary for this determination.

In a case where it is determined in step S103 that the subject distance is too short, the process proceeds to step S104.

In a case where it is determined that the subject distance is not too short, the process proceeds to step S105.

(Step S104)

In a case where it is determined in step S103 that the subject distance is too short, the process proceeds to step S104.

In step S104, the control unit changes states to make a transition from the current state="(State 1) high-quality composite image output enabled state" to "(State 3) proximity alert output state".

In the state of (State 3) proximity alert output state, there is performed a process of displaying the information "proximity alert [The subject is too close]" as the FIG. 14A composite image capturing guide information described above with reference to FIGS. 14A and 14B.

(Step S105)

Meanwhile, in a case where it is determined in step S103 that the subject distance is not too short, the process proceeds to step S105.

In step S105, the control unit changes states to make a transition from the current state="(State 1) high-quality composite image output enabled state" to "(State 2) obstacle alert output state".

In the state of (State 2) obstacle alert output state, there is performed a process of displaying the information "obstacle alert [There is an obstacle]" as the FIG. 14A composite image capturing guide information described above with reference to FIGS. 14A and 14B.

Note that the processing according to the flow shown in FIG. 20 is repeatedly performed in units of image frames input via the imaging unit of the image processing apparatus or in units of a plurality of predetermined frames.

Figure 21:
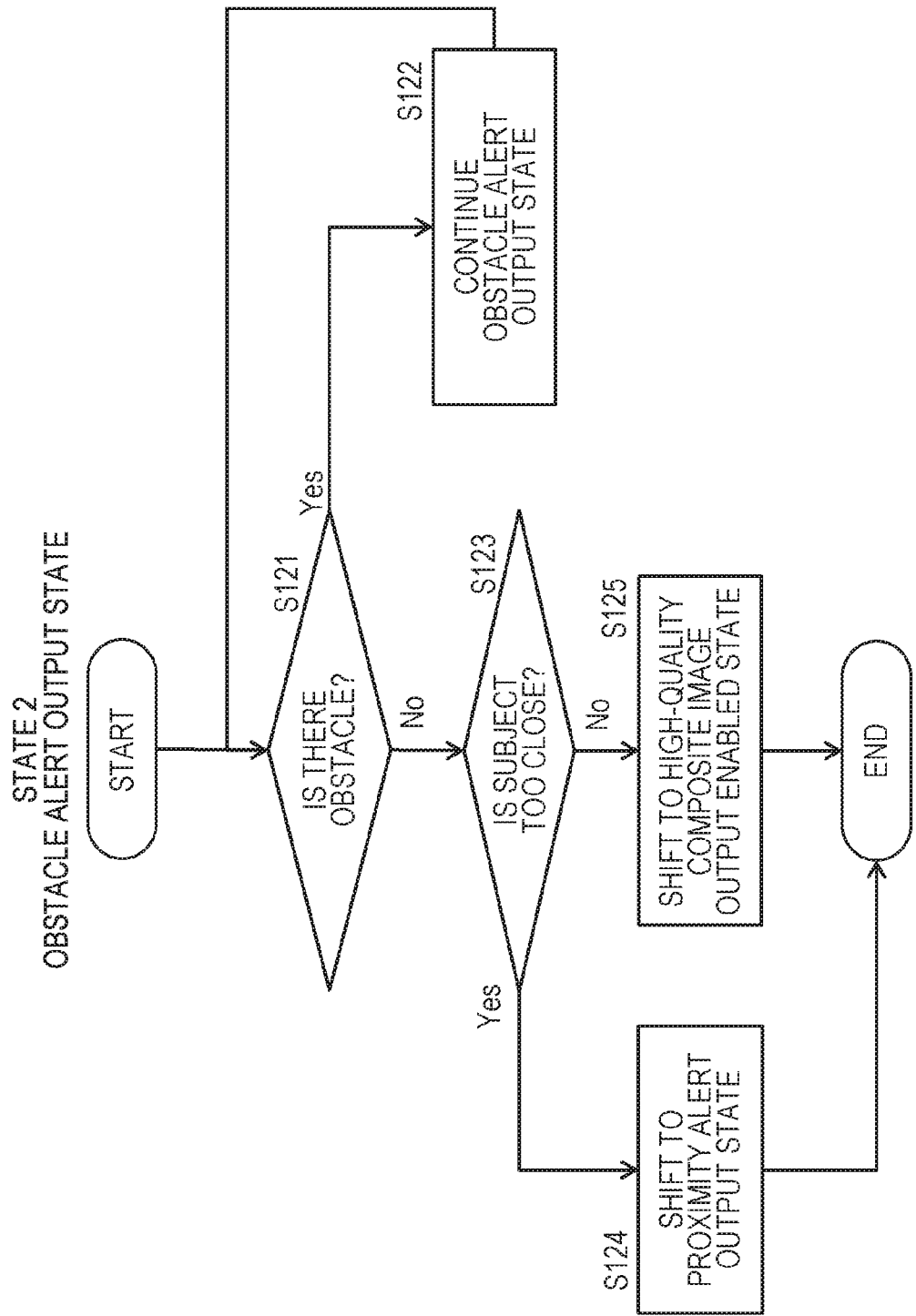
FIG. 21 shows a flowchart describing a sequence of a process to be performed by the image processing apparatus according to the present disclosure.

Next, described below with reference to the flow shown in FIG. 21 is a process sequence in a case where the image processing apparatus 400 is in the state of (State 2) obstacle alert output state, that is, in a case where the information (Display example 2) obstacle alert [There is an obstacle], described with reference to FIGS. 14A and 14B, is displayed on the display unit (touch panel) 131.

(Step S121)

In a case where the control unit of the image processing apparatus (camera) is in "(State 2) obstacle alert output state", the control unit first determines, in step S121, whether or not there is an obstacle in front of the subject in the image captured by the camera.

The imaging condition information 50 or information obtained from the feature amount calculation unit 124 and the image quality determination unit 125 of the image processing unit 120 is necessary for this determination.

In a case where it is determined in step S121 that there is an obstacle in front of the subject in the image captured by the camera, the process proceeds to step S122.

In a case where it is determined that there is no obstacle, the process proceeds to step S123.

(Step S122)

In a case where it is determined in step S121 that there is an obstacle in front of the subject in the image captured by the camera, the process proceeds to step S122.

In step S122, "(State 2) obstacle alert output state" is continued. Note that there is performed, in this state, a process of displaying the information "obstacle alert [There is an obstacle]" as the FIG. 14A composite image capturing guide information described above with reference to FIGS. 14A and 14B.

(Step S123)

Meanwhile, in a case where it is determined in step S121 that there is no obstacle in front of the subject in the image captured by the camera, the process proceeds to step S123.

The control unit determines in step S123 whether or not the subject distance is too short.

The imaging condition information 50 or information obtained from the feature amount calculation unit 124 and the image quality determination unit 125 of the image processing unit 120 is necessary for this determination.

In a case where it is determined in step S123 that the subject distance is too short, the process proceeds to step S124.

In a case where it is determined that the subject distance is not too short, the process proceeds to step S125.

(Step S124)

In a case where it is determined in step S123 that the subject distance is too short, the process proceeds to step S124.

In step S124, the control unit changes states to make a transition from the current state="(State 2) obstacle alert output state" to "(State 3) proximity alert output state".

In the state of (State 3) proximity alert output state, there is performed a process of displaying the information "proximity alert [The subject is too close]" as the FIG. 14A composite image capturing guide information described above with reference to FIGS. 14A and 14B.

(Step S125)

Meanwhile, in a case where it is determined in step S123 that the subject distance is not too short, the process proceeds to step S125.

In step S125, the control unit changes states to make a transition from the current state="(State 2) obstacle alert output state" to "(State 1) high-quality composite image output enabled state".

In the state of (State 1) high-quality composite image output enabled state, there is performed a process of displaying the information "composition process=ON [A good image can be captured]" as the FIG. 14A composite image capturing guide information described above with reference to FIGS. 14A and 14B.

Note that the processing according to the flow shown in FIG. 21 is repeatedly performed in units of image frames input via the imaging unit of the image processing apparatus or in units of a plurality of predetermined frames.

Figure 22:
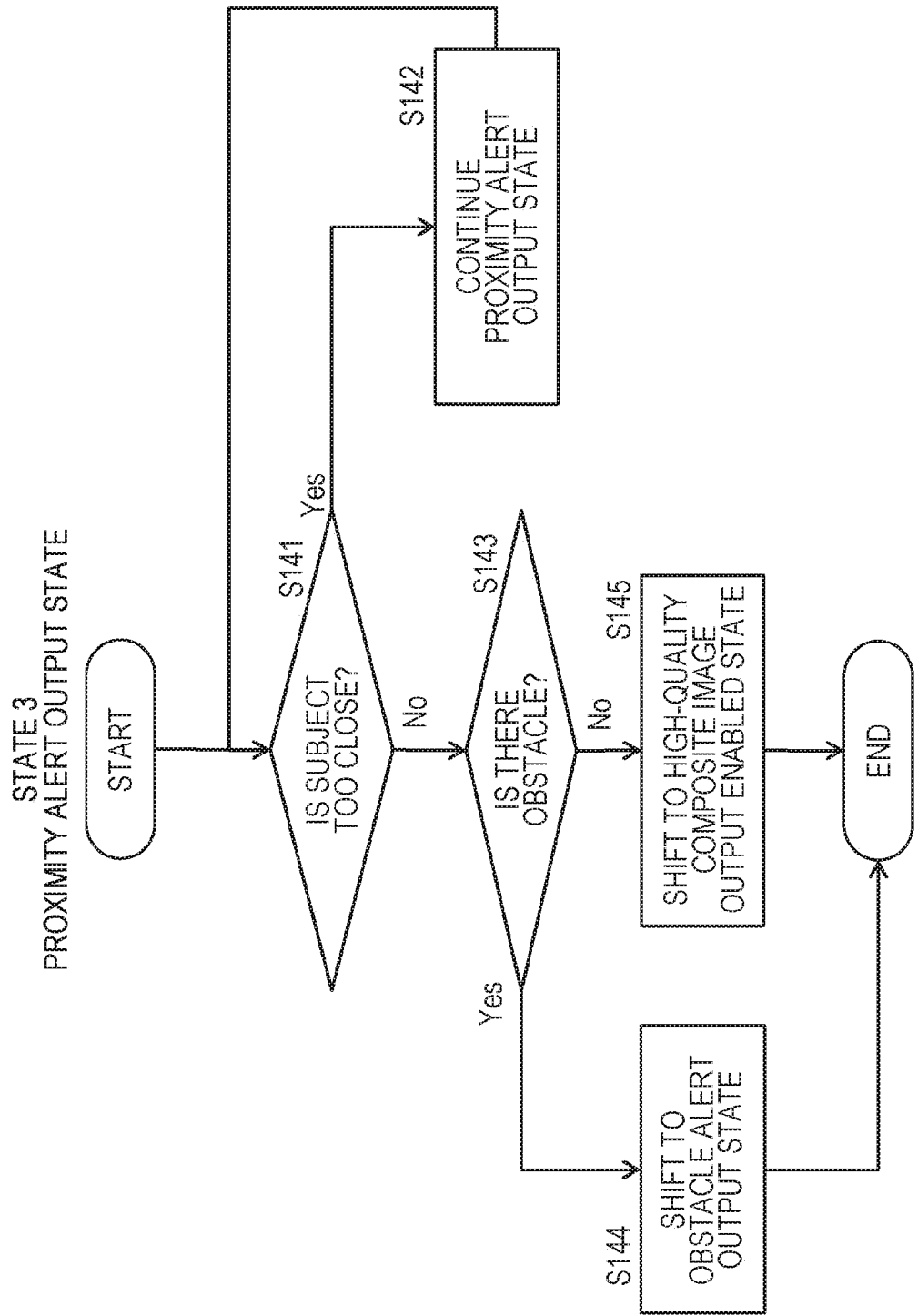
FIG. 22 shows a flowchart describing a sequence of a process to be performed by the image processing apparatus according to the present disclosure.

Next, described below with reference to the flow shown in FIG. 22 is a process sequence in a case where the image processing apparatus 400 is in the state of (State 3) proximity alert output state, that is, in a case where the information (Display example 3) proximity alert [The subject is too close], described with reference to FIGS. 14A and 14B, is displayed on the display unit (touch panel) 131.

(Step S141)

In a case where the control unit of the image processing apparatus (camera) is in "(State 3) proximity alert output state", the control unit first determines, in step S141, whether or not the distance to the subject in the image captured by the camera is too short.

The imaging condition information 50 or information obtained from the feature amount calculation unit 124 and the image quality determination unit 125 of the image processing unit 120 is necessary for this determination.

In a case where it is determined in step S141 that the subject is too close, the process proceeds to step S142.

In a case where it is determined that the subject is not too close, the process proceeds to step S143.

(Step S142)

In a case where it is determined in step S141 that the subject in the image captured by the camera is too close, the process proceeds to step S142.

In step S142, "(State 3) proximity alert output state" is continued.

Note that there is performed, in this state, a process of displaying the information "proximity alert [The subject is too close]" as the FIG. 14A composite image capturing guide information described above with reference to FIGS. 14A and 14B.

(Step S143)

Meanwhile, in a case where it is determined in step S141 that the distance to the subject in the image captured by the camera is not too short, the process proceeds to step S143.

In step S143, the control unit determines whether or not there is an obstacle in front of the subject.

The imaging condition information 50 or information obtained from the feature amount calculation unit 124 and the image quality determination unit 125 of the image processing unit 120 is necessary for this determination.

In a case where it is determined in step S143 that there is an obstacle in front of the subject, the process proceeds to step S144.

In a case where it is determined that there is no obstacle, the process proceeds to step S145.

(Step S144)

In a case where it is determined in step S143 that there is an obstacle in front of the subject, the process proceeds to step S144.

In step S144, the control unit changes states to make a transition from the current state="(State 3) proximity alert output state" to "(State 2) obstacle alert output state".

In the state of (State 2) obstacle alert output state, there is performed a process of displaying the information "obstacle alert [There is an obstacle]" as the FIG. 14A composite image capturing guide information described above with reference to FIGS. 14A and 14B.

(Step S145)

Meanwhile, in a case where it is determined in step S143 that there is no obstacle, the process proceeds to step S145.

In step S145, the control unit changes states to make a transition from the current state="(State 3) proximity alert output state" to "(State 1) high-quality composite image output enabled state".

In the state of (State 1) high-quality composite image output enabled state, there is performed a process of displaying the information "composition process=ON [A good image can be captured]" as the FIG. 14A composite image capturing guide information described above with reference to FIGS. 14A and 14B.

Note that the processing according to the flow shown in FIG. 22 is repeatedly performed in units of image frames input via the imaging unit of the image processing apparatus or in units of a plurality of predetermined frames.

5. Other Examples

In the embodiment described above, a configuration example has been described in which a process of determining which of the following four types of images has the highest image quality is performed to enable a high-quality image to be output:

(a) a color image-based composite image, (b) a black-and-white image-based composite image, (c) a monocular color image captured by the color image capturing unit 111, and (d) a monocular black-and-white image captured by the black-and-white image capturing unit 112.

The configuration of the present disclosure is not limited to the selective output of these four types of images, but is also applicable to the configuration of selective output of, for example, only the following two types of images:

a composite image, and a color image.

In addition, the configuration of the present disclosure can be applied to the configuration of selectively outputting various different images of two types or more.

Furthermore, in a case where it is determined to output an image by applying the configuration of the present invention, it is possible to reduce the power consumption of an image processing apparatus by stopping an imaging unit and an image processing unit other than those related to the image.

6. Summary of Configurations of Present Disclosure

The embodiments of the present disclosure have been described above in detail with reference to the specific examples. However, it is obvious that those skilled in the art can make modifications and substitutions of the embodiments without departing from the gist of the present disclosure. In other words, the present invention has been disclosed in the form of exemplification, and should not be restrictively interpreted. In order to judge the gist of the present disclosure, the section "CLAIMS" should be taken into consideration.

Note that the technology disclosed in the present specification can adopt the following configurations.

(1) An image processing apparatus including:

a composite image generation unit that performs a process of combining a color image and a black-and-white image captured from different viewpoints, to generate a composite image; and a display information control unit that performs control such that auxiliary information regarding the composite image is displayed on a display unit.

(2) The image processing apparatus according to (1), in which in a case where a subject is too close to generate a high-quality composite image, the display information control unit displays, on the display unit, a proximity alert that warns that the subject is too close.

(3) The image processing apparatus according to (1) or (2), in which in a case where a high-quality composite image cannot be generated due to an obstacle in front of a subject, the display information control unit displays, on the display unit, an obstacle alert that warns that the obstacle is in front of the subject.

(4) The image processing apparatus according to any one of (1) to (3), in which in a case where a high-quality composite image can be generated, the display information control unit displays, on the display unit, notification information indicating that a high-quality composite image can be captured.

(5) The image processing apparatus according to any one of (1) to (4), in which
the display information control unit displays, on the display unit, a composite image adaptation level indicator that indicates whether or not a current imaging condition is adapted to generation of a high-quality composite image.

(6) The image processing apparatus according to any one of (1) to (5), in which
the display information control unit displays a plurality of images including a composite image and a color image before composition in parallel on the display unit.

(7) The image processing apparatus according to any one of (1) to (5), in which
the display information control unit displays, on the display unit, an image in which a plurality of images including a composite image and a color image before composition is combined in units of divided areas obtained by division of a single image.

(8) The image processing apparatus according to any one of (1) to (7), in which
the image processing unit selects an image to be recorded from among a plurality of images including a composite image and a color image before composition, and outputs the selected image to be recorded, on the basis of image specification information input by a user.

(9) The image processing apparatus according to any one of (1) to (8), in which
the image processing unit includes:
an image quality determination unit that determines whether or not a high-quality composite image can be generated, and
the display information control unit displays, on the display unit, guide information for enabling generation of a high-quality composite image on the basis of information on determination of the image quality determination unit.

(10) The image processing apparatus according to any one of (1) to (9), in which the image processing apparatus makes a transition between following three states (a) to (c) according to a situation:
(a) a high-quality composite image output enabled state that is a state in which a high-quality composite image can be captured and thus, display indicating that a composite image can be captured is provided on the display unit;
(b) an obstacle alert output state that is a state in which a high-quality composite image cannot be captured due to an obstacle in front of a subject and thus, a warning about the obstacle is displayed on the display unit; and
(c) a proximity alert output state that is a state in which a subject is too close to capture a high-quality composite image and thus, a warning that the subject is too close is displayed on the display unit.

(11) An output information control method to be performed in an image processing apparatus including a composite image generation unit that performs a process of combining a color image and a black-and-white image captured from different viewpoints, to generate a composite image, the method including:
causing a display information control unit to perform control such that auxiliary information regarding the composite image is displayed on a display unit.

(12) A program that controls an information output process in an image processing apparatus including a composite image generation unit that performs a process of combining a color image and a black-and-white image captured from different viewpoints, to generate a composite image, the program causing:
a display information control unit to perform control such that auxiliary information regarding the composite image is displayed on a display unit.

Furthermore, the series of processes described in the specification can be implemented by hardware, software, or a configuration in which hardware and software are combined. In a case where the processes are implemented by software, it is possible to execute a program in which a process sequence has been recorded, after installing the program in a memory in a computer incorporated in dedicated hardware or installing the program on a general-purpose computer capable of performing various types of processing. For example, the program can be recorded in advance on a recording medium. In addition to being installed on a computer from the recording medium, the program can be received via a network such as a local area network (LAN) or the Internet and installed on a recording medium such as a built-in hard disk.

Note that the various processes described in the specification may be performed not only in time series according to the description, but also in parallel or separately depending on the processing capacity of an apparatus that performs the processes or depending on the needs. Furthermore, in the present specification, the term "system" refers to a logical set configuration of a plurality of devices, and is not limited to one in which the devices of each configuration are in the same casing.

INDUSTRIAL APPLICABILITY

As described above, according to the configuration of an embodiment of the present disclosure, an apparatus and a method are achieved in which guide information for enabling a high-quality composite image to be captured is output and in addition, a composite image, a color image, and the like are displayed in parallel to enable a user to select an image to be recorded.

Specifically, there are included, for example, a composite image generation unit that performs a process of combining a color image and a black-and-white image captured from different viewpoints, to generate a composite image; and a display information control unit that performs control such that auxiliary information regarding the composite image is displayed on a display unit. In a case where a subject is too close or in a case where a high-quality composite image cannot be generated due to an obstacle, the display information control unit outputs a proximity alert or an obstacle alert as warning information, and also displays a composite image adaptation level. Moreover, a composite image, a color image, and the like are displayed in parallel so that a user can select an image to be recorded.

According to the present configuration, an apparatus and a method are achieved in which guide information for enabling a high-quality composite image to be captured is output and in addition, a composite image, a color image, and the like are displayed in parallel to enable a user to select an image to be recorded.

REFERENCE SIGNS LIST

10 Image processing apparatus
11 Display unit
12 Operation unit
21 Color image capturing unit
22 Black-and-white image capturing unit
50 Imaging condition information
100 Image processing apparatus 110 Imaging unit
111 Color image capturing unit
112 Black-and-white image capturing unit
120 Image processing unit
121, 122 Preprocessing unit
123 Parallax detection unit
124 Feature amount calculation unit
125 Image quality determination unit
126 Composite image generation unit
127 Output image generation unit (selection/composition)
130 Output unit
131 Display unit (touch panel)
132 Storage unit
141 Sensor unit
142 Operation unit
150 Control unit
160 Communication unit
301 Composite image capturing guide information
302 Composite image adaptation level indicator
303 Display switching part
401 Display information control unit

The invention claimed is:

1. An image processing apparatus, comprising:
a central processing unit (CPU) configured to:
combine a color image and a black-and-white image captured from different viewpoints, to generate a composite image; and
control a display unit to display auxiliary information regarding the composite image, wherein
the auxiliary information comprises a composite image adaptation level indicator,
the composite image adaptation level indicator indicates a level corresponding to a plurality of images comprising at least the black-and-white image and the generated composite image, and
the level ranges from an unadaptable level for composite image capture to an adaptable level for the composite image capture.

2. The image processing apparatus according to claim 1, wherein
the CPU is further configured to control the display unit to display a proximity alert warning that a subject is too close, when the subject is too close to generate a high-quality composite image.

3. The image processing apparatus according to claim 1, wherein
the CPU is further configured to control the display unit to display an obstacle alert warning that an obstacle is in front of a subject, when a high-quality composite image cannot be generated due to the obstacle in front of the subject.

4. The image processing apparatus according to claim 1, wherein
the CPU is further configured to control the display unit to display notification information indicating that a high-quality composite image can be captured, when the high-quality composite image can be generated.

5. The image processing apparatus according to claim 1, wherein
the CPU is further configured to control the display unit to display, in parallel, at least the composite image and the color image before composition.

6. The image processing apparatus according to claim 1, wherein
the CPU is further configured to control the display unit to display an image having a plurality of divided areas, and
a first divided area of the plurality of divided areas and a second divided area of the plurality of divided areas comprise the composite image and the color image before composition, respectively.

7. The image processing apparatus according to claim 1, wherein the CPU is further configured to:
select an image to be recorded from the composite image and the color image before composition; and
output the selected image to be recorded, based on image specification information input by a user.

8. The image processing apparatus according to claim 1, wherein the CPU is further configured to:
determine whether a high-quality composite image can be generated, and
control the display unit to display guide information to enable generation of the high-quality composite image.

9. The image processing apparatus according to claim 1, wherein the CPU is further configured to make a transition between following three states (a) to (c) according to a situation:
(a) a high-quality composite image output enabled state that is a state in which a high-quality composite image can be captured, wherein a notification indicating that the composite image can be captured is displayed on the display unit;
(b) an obstacle alert output state that is a state in which the high-quality composite image cannot be captured due to an obstacle in front of a subject, wherein a warning about the obstacle is displayed on the display unit; and
(c) a proximity alert output state that is a state in which the subject is too close to capture the high-quality composite image, wherein a warning that the subject is too close is displayed on the display unit.

10. An output information control method, the method comprising:
combining a color image and a black-and-white image captured from different viewpoints, for generating a composite image; and
controlling a display unit for displaying auxiliary information regarding the composite image, wherein
the auxiliary information comprises a composite image adaptation level indicator,
the composite image adaptation level indicator indicates a level corresponding to a plurality of images comprising at least the black-and-white image and the generated composite image, and
the level ranges from an unadaptable level for composite image capture to an adaptable level for the composite image capture.

11. A non-transitory computer-readable medium having stored thereon, computer-executable instructions, which when executed by a processor of an information processing apparatus, cause the information processing apparatus to execute operations, the operations comprising:
combining a color image and a black-and-white image captured from different viewpoints, for generating a composite image; and
controlling a display unit for displaying auxiliary information regarding the composite image, wherein
the auxiliary information comprises a composite image adaptation level indicator,
the composite image adaptation level indicator indicates a level corresponding to a plurality of images comprising at least the black-and-white image and the generated composite image, and the level ranges from an unadaptable level for composite image capture to an adaptable level for the composite image capture.

\* \* \* \* \*